US012275180B2

(12) United States Patent
Sun et al.

(10) Patent No.: US 12,275,180 B2
(45) **Date of Patent: *Apr. 15, 2025**

(54) POLYMERIC MATERIAL FOR CONTAINER

(71) Applicant: Berry Plastics Corporation, Evansville, IN (US)

(72) Inventors: David Dezhou Sun, Evansville, IN (US); Philip A. Driskill, Newburgh, IN (US); Rolland Strasser, Hamden, CT (US)

(73) Assignee: Berry Plastics Corporation, Evansville, IN (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/135,048

(22) Filed: Dec. 28, 2020

(65) Prior Publication Data

US 2021/0114281 A1 Apr. 22, 2021

Related U.S. Application Data

(63) Continuation of application No. 17/005,585, filed on Aug. 28, 2020, now Pat. No. 10,906,228, which is a (Continued)

(51) Int. Cl.

| | |
|---|---|
| ***B29C 49/22*** | (2006.01) |
| ***B29C 44/22*** | (2006.01) |

(Continued)

(52) U.S. Cl.

CPC .............. *B29C 49/22* (2013.01); *B29C 44/22* (2013.01); *B29C 49/0005* (2013.01);

(Continued)

(58) Field of Classification Search

CPC ................ B65D 81/38; B65D 81/3865; B65D 81/3867; B65D 81/3869; B65D 81/3874; B65D 81/3876; B65D 81/3879; B65D 81/3881; B65D 81/3886; B32B 1/00; B32B 1/02; B32B 1/08; B32B 5/18; B32B 7/02; B32B 27/065; B32B 27/32; B32B 27/327; B32B 2266/025; B32B 2307/304;

(Continued)

(56) References Cited

U.S. PATENT DOCUMENTS

| | | |
|---|---|---|
| 1,396,282 A | 11/1921 | Penn |
| 1,435,120 A | 11/1922 | Holman |

(Continued)

FOREIGN PATENT DOCUMENTS

| | | |
|---|---|---|
| AU | 2013334155 B2 | 2/2017 |
| BE | 898053 | 4/1984 |

(Continued)

OTHER PUBLICATIONS

English machine translation for JP2001-018943 (2001). (Year: 2001).*

(Continued)

*Primary Examiner* — Michael C Miggins

(74) *Attorney, Agent, or Firm* — Barnes & Thornburg LLP

(57) ABSTRACT

A formulation for producing a polymeric material including polypropylene, a chemical blowing agent, and optional components as described.

20 Claims, 1 Drawing Sheet

Related U.S. Application Data continuation of application No. 15/713,799, filed on Sep. 25, 2017, now Pat. No. 10,792,851, which is a continuation of application No. 14/468,789, filed on Aug. 26, 2014, now Pat. No. 9,931,781.

(60) Provisional application No. 61/869,928, filed on Aug. 26, 2013.

(51) Int. Cl.

| | |
|---|---|
| ***B29C 49/00*** | (2006.01) |
| ***B29C 49/04*** | (2006.01) |
| ***B29K 23/00*** | (2006.01) |
| ***B29K 105/00*** | (2006.01) |
| ***B29K 105/04*** | (2006.01) |
| ***B29L 9/00*** | (2006.01) |
| ***B29L 31/00*** | (2006.01) |
| ***B65D 81/38*** | (2006.01) |

(52) U.S. Cl.
CPC .......... *B29C 49/04* (2013.01); *B65D 81/3846* (2013.01); *B29K 2023/12* (2013.01); *B29K 2023/14* (2013.01); *B29K 2105/043* (2013.01); *B29K 2105/258* (2013.01); *B29K 2995/0015* (2013.01); *B29K 2995/0063* (2013.01); *B29L 2009/00* (2013.01); *B29L 2031/712* (2013.01)

(58) Field of Classification Search
CPC ......... B32B 2307/4023; B32B 2307/72; Y10T 428/1376; A47G 19/2205; A47G 23/0216; A47G 2023/0291
See application file for complete search history.

(56) References Cited

U.S. PATENT DOCUMENTS 1,920,529 A 8/1933 Sidebotham
1,969,030 A 8/1934 Page
2,097,899 A 11/1937 Smith
2,103,831 A 12/1937 Sidon
2,809,776 A 3/1956 Barrington
3,182,882 A 5/1965 Aellen, Jr.
3,227,784 A 1/1966 Blades
3,252,387 A 5/1966 Schur
3,312,383 A 4/1967 Shapiro
3,327,038 A 6/1967 Fox
3,327,103 A 6/1967 Bonnet
3,344,222 A 9/1967 Shapiro
3,381,880 A 5/1968 Lewallen et al.
3,409,204 A 11/1968 Carle
3,431,163 A 3/1969 Gilbert
3,443,715 A 5/1969 Edwards
3,468,467 A 9/1969 Amberg
3,547,012 A 12/1970 Amberg
3,583,624 A 6/1971 Peacock
3,658,615 A 4/1972 Amberg
3,661,282 A 5/1972 Buhayar
3,703,255 A 11/1972 Wade
3,733,381 A 5/1973 Willette
3,793,283 A 2/1974 Frailey
3,846,349 A 11/1974 Harada
3,907,193 A 9/1975 Heller
3,919,368 A 11/1975 Seto
RE28,658 E 12/1975 Macdaniel
3,967,991 A 7/1976 Shimano
3,969,173 A 7/1976 Amberg
3,971,696 A 7/1976 Manfredi
3,973,721 A 8/1976 Nakane
4,026,458 A 5/1977 Morris
4,036,675 A 7/1977 Amberg
4,049,122 A 9/1977 Maxwell
4,070,513 A 1/1978 Rhoads
4,106,397 A 8/1978 Amberg
4,171,085 A 10/1979 Doty
4,197,948 A 4/1980 Amberg
4,240,568 A 12/1980 Pool
4,284,226 A 8/1981 Herbst
4,288,026 A 9/1981 Wilhelm
4,298,331 A 11/1981 Mueller
4,299,349 A 11/1981 Gilden
4,300,891 A 11/1981 Bemiss
4,306,849 A 12/1981 Cress
4,310,369 A 1/1982 Miller
4,349,400 A 9/1982 Gilden
4,365,460 A 12/1982 Cress
4,391,666 A 7/1983 Mueller
4,409,045 A 10/1983 Busse
4,490,130 A 12/1984 Konzal
4,550,046 A 10/1985 Miller
4,579,275 A 4/1986 Peelman
4,604,324 A 8/1986 Nahmias
4,621,763 A 11/1986 Brauner
4,706,873 A 11/1987 Schulz
4,720,023 A 1/1988 Jeff
4,856,989 A 8/1989 Siebert
4,878,970 A 11/1989 Schubert
4,911,978 A * 3/1990 Tsubone .................. B32B 27/20 428/36.5
4,918,112 A 4/1990 Roox
4,940,736 A 7/1990 Alteepping
5,078,817 A 1/1992 Takagaki
5,116,881 A 5/1992 Park
5,149,579 A 9/1992 Park
5,158,986 A 10/1992 Cha
5,160,674 A 11/1992 Colton
5,180,751 A 1/1993 Park
5,236,963 A 8/1993 Jacoby
5,256,462 A 10/1993 Callahan
5,286,428 A 2/1994 Hayashi
5,308,568 A 5/1994 Lipp
5,348,795 A 9/1994 Park
5,366,791 A 11/1994 Carr
5,385,260 A 1/1995 Gatcomb
5,443,769 A 8/1995 Karabedian
5,445,315 A 8/1995 Shelby
5,462,794 A 10/1995 Lindemann
5,490,631 A 2/1996 Iioka
5,507,640 A 4/1996 Gilmer
5,547,124 A 8/1996 Mueller
5,549,864 A 8/1996 Greene
5,605,936 A 2/1997 Denicolajr
5,622,308 A 4/1997 Ito
5,629,076 A 5/1997 Fukasawa
5,669,553 A 9/1997 Smith
5,713,512 A 2/1998 Barrett
5,759,624 A 6/1998 Neale
5,765,710 A 6/1998 Bergerioux
5,766,709 A 6/1998 Geddes
5,769,311 A 6/1998 Morita
5,819,507 A 10/1998 Kaneko
5,840,139 A 11/1998 Geddes
5,866,053 A 2/1999 Park
5,868,309 A 2/1999 Sandstrom
5,895,614 A 4/1999 Rivera
5,925,450 A 7/1999 Karabedian
5,928,741 A 7/1999 Andersen
5,929,127 A 7/1999 Raetzsch
5,944,225 A 8/1999 Kawolics
5,948,839 A 9/1999 Chatterjee
6,007,437 A 12/1999 Schickert
6,010,062 A 1/2000 Shimono
6,030,476 A 2/2000 Geddes
6,034,144 A 3/2000 Shioya
6,051,174 A 4/2000 Park
6,071,580 A 6/2000 Bland
6,077,878 A 6/2000 Okura
6,083,611 A 7/2000 Eichbauer
6,103,153 A 8/2000 Park
6,109,518 A 8/2000 Mueller
6,114,025 A 9/2000 DeVaudreuil
6,129,653 A 10/2000 Fredricks
6,136,396 A 10/2000 Gilmer

(56) References Cited

U.S. PATENT DOCUMENTS 6,139,665 A 10/2000 Schmelzer
6,142,331 A 11/2000 Breining
6,169,122 B1 1/2001 Blizard
6,174,930 B1 1/2001 Agarwal
6,193,098 B1 2/2001 Mochizuki
6,218,023 B1 4/2001 Denicola
6,225,366 B1 5/2001 Raetzsch
6,231,942 B1 5/2001 Blizard
6,235,380 B1 5/2001 Tupil
6,251,319 B1 6/2001 Tusim
6,257,485 B1 7/2001 Sadlier
6,258,862 B1 7/2001 Matz
6,267,837 B1 7/2001 Mitchell
6,294,115 B1 9/2001 Blizard
6,306,973 B1 10/2001 Takaoka
6,308,883 B1 10/2001 Schmelzer
6,319,590 B1 11/2001 Geddes
6,328,916 B1 12/2001 Nishikawa
6,376,059 B1 4/2002 Anderson
6,378,733 B1 4/2002 Boonzaier
6,379,802 B2 4/2002 Ito
6,383,425 B1 5/2002 Wu
6,417,240 B1 7/2002 Park
6,420,024 B1 7/2002 Perez
6,444,073 B1 9/2002 Reeves
6,455,150 B1 9/2002 Sheppard
6,468,451 B1 10/2002 Perez
6,472,473 B1 10/2002 Ansems
RE37,932 E 12/2002 Baldwin
6,512,019 B1 1/2003 Agarwal
6,521,675 B1 2/2003 Wu
6,541,105 B1 4/2003 Park
6,562,447 B2 5/2003 Wu
6,565,934 B1 5/2003 Fredricks
6,586,532 B1 7/2003 Gauthy
6,593,005 B2 7/2003 Tau
6,613,811 B1 9/2003 Pallaver
6,646,019 B2 11/2003 Perez
6,649,666 B1 11/2003 Read
6,713,139 B2 3/2004 Usui
6,720,362 B1 4/2004 Park
6,749,913 B2 6/2004 Watanabe
6,779,662 B2 8/2004 Dorsey
6,814,253 B2 11/2004 Wong
6,875,826 B1 4/2005 Huovinen
6,883,677 B2 4/2005 Goeking
6,884,377 B1 4/2005 Burnham
6,884,851 B2 4/2005 Gauthy
6,908,651 B2 6/2005 Watanabe
6,926,507 B2 8/2005 Cardona
6,926,512 B2 8/2005 Wu
6,982,107 B1 1/2006 Hennen
7,056,563 B2 6/2006 Halabisky
7,070,852 B1 7/2006 Reiners
7,074,466 B2 7/2006 Debraal
7,094,463 B2 8/2006 Haas
7,121,991 B2 10/2006 Mannlein
7,144,532 B2 12/2006 Kim
7,173,069 B2 2/2007 Swennen
7,234,629 B2 6/2007 Ho
7,281,650 B1 10/2007 Milan
7,311,243 B1 12/2007 Konzal
7,355,089 B2 4/2008 Chang
7,361,720 B2 4/2008 Pierini
7,365,136 B2 4/2008 Huovinen
7,423,071 B2 9/2008 Mogami
7,458,504 B2 12/2008 Robertson
7,504,347 B2 3/2009 Poon
7,510,098 B2 3/2009 Hartjes
7,513,386 B2 4/2009 Hartjes
7,514,517 B2 4/2009 Hoenig
7,524,911 B2 4/2009 Karjala
7,546,932 B2 6/2009 Smith
7,557,147 B2 7/2009 Martinez
7,579,408 B2 8/2009 Walton
7,582,716 B2 9/2009 Liang
7,585,557 B2 9/2009 Aylward
7,592,397 B2 9/2009 Markovich
7,608,668 B2 10/2009 Shan
7,622,179 B2 11/2009 Patel
7,622,529 B2 11/2009 Walton
7,629,416 B2 12/2009 Li
7,655,296 B2 2/2010 Haas
7,662,881 B2 2/2010 Walton
7,666,918 B2 2/2010 Prieto
7,671,106 B2 3/2010 Markovich
7,671,131 B2 3/2010 Hughes
7,673,564 B2 3/2010 Wolf
7,687,442 B2 3/2010 Walton
7,695,812 B2 4/2010 Peng
7,714,071 B2 5/2010 Hoenig
7,732,052 B2 6/2010 Chang
7,737,061 B2 6/2010 Chang
7,737,215 B2 6/2010 Chang
7,741,397 B2 6/2010 Liang
7,754,814 B2 7/2010 Barcus
7,759,404 B2 7/2010 Burgun
7,786,216 B2 8/2010 Soediono
7,795,321 B2 9/2010 Cheung
7,803,728 B2 9/2010 Poon
7,811,644 B2 10/2010 Debraal
7,818,866 B2 10/2010 Hollis
7,820,282 B2 10/2010 Haas
7,825,166 B2 11/2010 Sasaki
7,841,974 B2 11/2010 Hartjes
7,842,770 B2 11/2010 Liang
7,858,706 B2 12/2010 Arriola
7,863,379 B2 1/2011 Kapur
7,883,769 B2 2/2011 Seth
7,893,166 B2 2/2011 Shan
7,897,689 B2 3/2011 Harris
7,906,587 B2 3/2011 Poon
7,910,658 B2 3/2011 Chang
7,915,192 B2 3/2011 Arriola
7,918,005 B2 4/2011 Hollis
7,918,016 B2 4/2011 Hollis
7,922,071 B2 4/2011 Robertson
7,928,162 B2 4/2011 Kiss
7,935,740 B2 5/2011 Dang
7,947,367 B2 5/2011 Poon
7,951,882 B2 5/2011 Arriola
7,977,397 B2 7/2011 Cheung
7,989,543 B2 8/2011 Karjala
7,993,254 B2 8/2011 Robertson
7,998,579 B2 8/2011 Lin
7,998,728 B2 8/2011 Rhoads
8,003,176 B2 8/2011 Ylitalo
8,003,744 B2 8/2011 Okamoto
8,012,550 B2 9/2011 Ylitalo
8,026,291 B2 9/2011 Handa
8,043,695 B2 10/2011 Ballard
8,067,319 B2 11/2011 Poon
8,076,381 B2 12/2011 Miyagawa
8,076,416 B2 12/2011 Ellul
8,084,537 B2 12/2011 Walton
8,087,147 B2 1/2012 Hollis
8,105,459 B2 1/2012 Alvarez
8,119,237 B2 2/2012 Peng
8,124,234 B2 2/2012 Weaver
8,173,233 B2 5/2012 Rogers
8,198,374 B2 6/2012 Arriola
8,211,982 B2 7/2012 Harris
8,227,075 B2 7/2012 Matsushita
8,273,068 B2 9/2012 Chang
8,273,826 B2 9/2012 Walton
8,273,838 B2 9/2012 Shan
8,288,470 B2 10/2012 Ansems
8,304,496 B2 11/2012 Weaver
8,404,780 B2 3/2013 Weaver
8,444,905 B2 5/2013 Li
8,679,620 B2 3/2014 Matsushita
8,715,449 B2 5/2014 Leser
8,721,823 B2 5/2014 Vaideeswaran
8,795,827 B2 8/2014 Siche

(56) References Cited

U.S. PATENT DOCUMENTS 8,883,280 B2 11/2014 Leser
9,067,705 B2 6/2015 Leser
9,102,461 B2 8/2015 Leser
9,180,995 B2 11/2015 Iyori
9,346,605 B2 5/2016 Leser
9,358,772 B2 6/2016 Leser
9,688,456 B2 6/2017 Euler
9,758,292 B2 9/2017 Leser
9,758,293 B2 9/2017 Leser
9,993,098 B2 6/2018 Leser
10,011,696 B2 7/2018 Leser
10,059,037 B2 8/2018 Li
10,266,664 B2 4/2019 Sun
10,899,532 B2 1/2021 Leser
10,906,725 B2 2/2021 Leser
11,091,311 B2 8/2021 Euler
11,214,429 B2 1/2022 Euler
2001/0010848 A1 8/2001 Usui
2001/0010849 A1 8/2001 Blizard
2001/0036520 A1 11/2001 Hall
2001/0038893 A1 11/2001 Mohan
2001/0039299 A1 11/2001 Park
2001/0041236 A1 11/2001 Usui
2002/0030296 A1 3/2002 Geddes
2002/0035164 A1 3/2002 Wu
2002/0041046 A1 4/2002 Hartjes
2002/0058126 A1 5/2002 Kannankeril
2002/0135088 A1 9/2002 Harfmann
2002/0137851 A1 9/2002 Kim
2002/0144769 A1 10/2002 Debraal
2002/0172818 A1 11/2002 Debraal
2003/0003251 A1 1/2003 Debraal
2003/0017284 A1 1/2003 Watanabe
2003/0021921 A1 1/2003 Debraal
2003/0029876 A1 2/2003 Giraud
2003/0069362 A1 4/2003 Ramanathan
2003/0108695 A1 6/2003 Freek
2003/0138515 A1 7/2003 Harfmann
2003/0186039 A1* 10/2003 Hanada .................. B32B 27/32 428/304.4
2003/0211310 A1 11/2003 Haas
2003/0228336 A1 12/2003 Gervasio
2003/0232210 A1 12/2003 Haas
2004/0031714 A1 2/2004 Hanson
2004/0037980 A1 2/2004 Debraal
2004/0038018 A1 2/2004 Anderson
2004/0115418 A1 6/2004 Anderson
2004/0162358 A1 8/2004 Yamamoto
2004/0162363 A1 8/2004 Mochizuki
2004/0170814 A1 9/2004 Vanhandel
2005/0003122 A1 1/2005 Debraal
2005/0006449 A1 1/2005 Damato
2005/0040218 A1 2/2005 Hinchey
2005/0100697 A1 5/2005 Sandstrom
2005/0101926 A1 5/2005 Ausen
2005/0104365 A1 5/2005 Haas
2005/0115975 A1 6/2005 Smith
2005/0121457 A1 6/2005 Wilson
2005/0124709 A1 6/2005 Krueger
2005/0145317 A1 7/2005 Yamamoto
2005/0147807 A1 7/2005 Haas
2005/0159496 A1 7/2005 Bambara
2005/0165165 A1 7/2005 Zwynenburg
2005/0184136 A1 8/2005 Baynum
2005/0236294 A1 10/2005 Herbert
2005/0256215 A1 11/2005 Burnham
2005/0272858 A1 12/2005 Pierini
2005/0288383 A1 12/2005 Haas
2006/0000882 A1 1/2006 Darzinskas
2006/0073298 A1 4/2006 Hutchinson
2006/0094577 A1 5/2006 Mannlein
2006/0095151 A1 5/2006 Mannlein
2006/0108409 A1 5/2006 Pyper
2006/0135679 A1 6/2006 Winowiecki
2006/0135699 A1 6/2006 Li
2006/0148920 A1 7/2006 Musgrave
2006/0151584 A1 7/2006 Wonnacott
2006/0178478 A1 8/2006 Ellul
2006/0198983 A1 9/2006 Patel
2006/0199006 A1 9/2006 Poon
2006/0199030 A1 9/2006 Liang
2006/0199744 A1 9/2006 Walton
2006/0199872 A1 9/2006 Prieto
2006/0199884 A1 9/2006 Hoenig
2006/0199887 A1 9/2006 Liang
2006/0199896 A1 9/2006 Walton
2006/0199897 A1 9/2006 Karjala
2006/0199905 A1 9/2006 Hughes
2006/0199906 A1 9/2006 Walton
2006/0199907 A1 9/2006 Chang
2006/0199908 A1 9/2006 Cheung
2006/0199910 A1 9/2006 Walton
2006/0199911 A1 9/2006 Markovich
2006/0199912 A1 9/2006 Fuchs
2006/0199914 A1 9/2006 Harris
2006/0199930 A1 9/2006 Shan
2006/0199931 A1 9/2006 Poon
2006/0199933 A1 9/2006 Okamoto
2006/0211819 A1 9/2006 Hoenig
2006/0234033 A1 10/2006 Nishikawa
2006/0286325 A1 12/2006 Swoboda
2006/0289609 A1 12/2006 Fritz
2006/0289610 A1 12/2006 Kling
2007/0000983 A1 1/2007 Spurrell
2007/0010616 A1 1/2007 Kapur
2007/0032600 A1 2/2007 Mogami
2007/0056964 A1 3/2007 Holcomb
2007/0065615 A1 3/2007 Odle
2007/0066756 A1 3/2007 Poon
2007/0078222 A1 4/2007 Chang
2007/0095837 A1 5/2007 Meier
2007/0112127 A1 5/2007 Soediono
2007/0141188 A1 6/2007 Kim
2007/0155900 A1 7/2007 Chang
2007/0167315 A1 7/2007 Arriola
2007/0167575 A1 7/2007 Weaver
2007/0167578 A1 7/2007 Arriola
2007/0202330 A1 8/2007 Peng
2007/0219334 A1 9/2007 Lipishan
2008/0020162 A1 1/2008 Fackler
2008/0044617 A1 2/2008 Schmitz
2008/0045638 A1 2/2008 Chapman
2008/0095960 A1 4/2008 Schell
2008/0118738 A1 5/2008 Boyer
2008/0121681 A1 5/2008 Wiedmeyer
2008/0138593 A1 6/2008 Martinez
2008/0156857 A1 7/2008 Johnston
2008/0177242 A1 7/2008 Chang
2008/0187694 A1 8/2008 Alvarez
2008/0227877 A1 9/2008 Stadlbauer
2008/0234435 A1 9/2008 Chang
2008/0260996 A1 10/2008 Heilman
2008/0269388 A1 10/2008 Markovich
2008/0280517 A1 11/2008 Chang
2008/0281037 A1 11/2008 Karjala
2008/0302800 A1 12/2008 Chou
2008/0311812 A1 12/2008 Arriola
2009/0041965 A1 2/2009 Kochem
2009/0042472 A1 2/2009 Poon
2009/0068402 A1 3/2009 Yoshida
2009/0069523 A1 3/2009 Itakura
2009/0076216 A1 3/2009 Kiss
2009/0096130 A1 4/2009 Jones
2009/0105417 A1 4/2009 Walton
2009/0110855 A1 4/2009 McCarthy
2009/0110944 A1 4/2009 Aguirre
2009/0170679 A1 7/2009 Hartjes
2009/0220711 A1 9/2009 Chang
2009/0247033 A1 10/2009 Peng
2009/0263645 A1 10/2009 Barger
2009/0275690 A1 11/2009 Weaver
2009/0324914 A1 12/2009 Lieng
2010/0000183 A1 1/2010 Nantin
2010/0025073 A1 2/2010 Fagrell

(56) References Cited

U.S. PATENT DOCUMENTS

2010/0028568 A1 2/2010 Weaver
2010/0029827 A1 2/2010 Ansems
2010/0040818 A1 2/2010 Farha
2010/0055358 A1 3/2010 Weaver
2010/0069574 A1 3/2010 Shan
2010/0093942 A1 4/2010 Silvis
2010/0108695 A1 5/2010 Zhang
2010/0112247 A1 5/2010 Jari
2010/0116422 A1 5/2010 Vaideeswaran
2010/0137118 A1 6/2010 Chang
2010/0147447 A1 6/2010 Mazzarolo
2010/0168267 A1 7/2010 Dang
2010/0181328 A1 7/2010 Cook
2010/0181370 A1 7/2010 Berbert
2010/0196610 A1 8/2010 Chang
2010/0215934 A1 8/2010 Mariezkurrena
2010/0240818 A1 9/2010 Walton
2010/0247830 A1 9/2010 Hernandez
2010/0279571 A1 11/2010 Poon
2010/0324202 A1 12/2010 Bafna
2011/0003929 A1 1/2011 Soediono
2011/0008570 A1 1/2011 Seth
2011/0009513 A1 1/2011 Chaudhary
2011/0014835 A1 1/2011 Sieradzki
2011/0091688 A1 4/2011 Maurer
2011/0104414 A1 5/2011 Onodera
2011/0111150 A1 5/2011 Matsuzaki
2011/0118370 A1 5/2011 Jiang
2011/0118416 A1 5/2011 Arriola
2011/0124818 A1 5/2011 Arriola
2011/0136959 A1 6/2011 Brandstetter
2011/0144240 A1 6/2011 Harris
2011/0192750 A1 8/2011 Kokin
2011/0217492 A1 9/2011 Stamatiou
2011/0229693 A1 9/2011 Maurer
2011/0230108 A1 9/2011 Arriola
2011/0285048 A1 11/2011 Barger
2011/0293914 A1 12/2011 Maurer
2011/0318560 A1 12/2011 Yun
2012/0004087 A1 1/2012 Tharayil
2012/0024873 A1 2/2012 Roseblade
2012/0028065 A1 2/2012 Bafna
2012/0041148 A1 2/2012 Bafna
2012/0043374 A1 2/2012 Lemon
2012/0045603 A1 2/2012 Zerafati
2012/0108714 A1 5/2012 Wittner
2012/0108741 A1 5/2012 Wu
2012/0108743 A1 5/2012 Krishnaswamy
2012/0125926 A1 5/2012 Iyori
2012/0132699 A1 5/2012 Mann
2012/0178896 A1 7/2012 Bastioli
2012/0184657 A1 7/2012 Lake
2012/0193365 A1 8/2012 Humphries
2012/0199278 A1 8/2012 Lee
2012/0199279 A1 8/2012 Lee
2012/0199641 A1 8/2012 Hsieh
2012/0214890 A1 8/2012 Senda
2012/0220730 A1 8/2012 Li
2012/0225961 A1 9/2012 Vanhorn
2012/0237734 A1 9/2012 Maurer
2012/0267368 A1 10/2012 Wu
2012/0270039 A1 10/2012 Tynys
2012/0295994 A1 11/2012 Bernreitner
2012/0318805 A1* 12/2012 Leser ................ B29C 66/73132 220/592.2
2012/0318807 A1 12/2012 Leser
2013/0023598 A1 1/2013 Song
2013/0052358 A1 2/2013 Alessandro
2013/0140320 A1 6/2013 Nadella
2013/0216744 A1 8/2013 Liao
2013/0280517 A1 10/2013 Buehring
2013/0303645 A1 11/2013 Dix
2014/0116977 A1 5/2014 Minnette
2014/0131430 A1 5/2014 Leser
2014/0166738 A1 6/2014 Euler
2014/0167311 A1 6/2014 Leser
2014/0262916 A1 9/2014 Minnette
2014/0263367 A1 9/2014 Robertson
2014/0361013 A1 12/2014 Perick
2015/0051302 A1 2/2015 Leser
2015/0250342 A1 9/2015 Euler
2015/0258771 A1 9/2015 Leser
2016/0082692 A1 3/2016 Li
2016/0082693 A1 3/2016 Li
2016/0137804 A1 5/2016 Van Der Ven
2016/0257030 A1 9/2016 Sun
2016/0257799 A1 9/2016 Sun
2017/0002117 A1 1/2017 Layman
2017/0174865 A1 6/2017 Dhaliwal
2017/0232715 A1 8/2017 Fehr
2018/0099798 A1 4/2018 Lehrter
2018/0201752 A1 7/2018 Lin
2018/0354237 A1 12/2018 De Jonge
2019/0045954 A1 2/2019 Euler
2019/0047265 A1 2/2019 Euler
2020/0361184 A1 11/2020 Saniei

FOREIGN PATENT DOCUMENTS

CA 2078123 9/1991
CA 2291607 A1 6/2000
CA 2765489 12/2010
CN 1118239 A 3/1996
CN 1288427 3/2001
CN 1495100 5/2004
CN 1523051 8/2004
CN 1942370 4/2007
CN 101044195 9/2007
CN 101098918 A 1/2008
CN 101104716 1/2008
CN 101352923 1/2009
CN 101370873 2/2009
CN 101429309 5/2009
CN 101456927 A 6/2009
CN 101531260 9/2009
CN 101538387 9/2009
CN 101560307 10/2009
CN 201347706 Y 11/2009
CN 102030960 4/2011
CN 102070841 A 5/2011
CN 102089370 6/2011
CN 102115561 A 7/2011
CN 102245368 11/2011
CN 102391570 3/2012
DE 2831240 1/1980
DE 2831240 C 3/1988
DE 102006025612 A1 11/2007
DE 102008031812 12/2009
EP 0001791 5/1979
EP 0086869 A1 8/1983
EP 0161597 11/1985
EP 0318167 A2 5/1989
EP 0520028 12/1992
EP 0570221 11/1993
EP 0588321 3/1994
EP 0659647 6/1995
EP 0879844 11/1998
EP 960826 A2 1/1999
EP 0972727 1/2000
EP 0796199 2/2001
EP 0940240 10/2002
EP 1308263 A2 5/2003
EP 1323779 7/2003
EP 1479716 11/2004
EP 1666530 6/2006
EP 1704047 9/2006
EP 1749634 A2 2/2007
EP 1754744 2/2007
EP 1921023 A1 5/2008
EP 1939099 A1 7/2008
EP 2266894 12/2010
EP 2386584 A1 11/2011
EP 2386601 11/2011
EP 2554374 A1 2/2013

(56) References Cited

FOREIGN PATENT DOCUMENTS

| | | | |
|---|---|---|---|
| EP | 2720954 | | 4/2014 |
| EP | 2912142 | A4 | 3/2016 |
| GB | 1078326 | | 8/1967 |
| GB | 2322100 | | 8/1998 |
| GB | 2485077 | A | 5/2012 |
| GB | 2504166 | A | 1/2014 |
| GB | 2506796 | A | 4/2014 |
| JP | 52123043 | U | 10/1977 |
| JP | S5641146 | A | 4/1981 |
| JP | 58029618 | | 2/1983 |
| JP | H02129040 | U | 5/1990 |
| JP | H02269683 | | 11/1990 |
| JP | H0543967 | | 2/1993 |
| JP | 0615751 | | 1/1994 |
| JP | 06192460 | | 7/1994 |
| JP | H06322167 | A | 11/1994 |
| JP | H08067758 | | 3/1996 |
| JP | 2000128255 | | 5/2000 |
| JP | P310847 | | 12/2000 |
| JP | 2001310429 | | 11/2001 |
| JP | 2001315277 | | 11/2001 |
| JP | 2001329099 | A | 11/2001 |
| JP | 2001348454 | A | 12/2001 |
| JP | 2003292663 | | 10/2003 |
| JP | 2003321566 | | 11/2003 |
| JP | 200418101 | | 1/2004 |
| JP | 2004018101 | | 1/2004 |
| JP | 2004067820 | A | 3/2004 |
| JP | 2004168421 | A | 6/2004 |
| JP | 2004330464 | | 11/2004 |
| JP | 2005053494 | A | 3/2005 |
| JP | 2005138508 | A | 6/2005 |
| JP | 2005272542 | | 10/2005 |
| JP | 2006008988 | A | 1/2006 |
| JP | 2006096390 | | 4/2006 |
| JP | 2006130814 | A | 5/2006 |
| JP | 2006142008 | A | 6/2006 |
| JP | 200791323 | | 4/2007 |
| JP | 2007154172 | | 6/2007 |
| JP | 3140847 | | 4/2008 |
| JP | 2008162700 | | 7/2008 |
| JP | 2009504858 | | 2/2009 |
| JP | 2009066856 | A | 4/2009 |
| JP | 2009126922 | | 6/2009 |
| JP | 2009138029 | | 6/2009 |
| JP | 2009190756 | A | 8/2009 |
| JP | 2010173258 | | 8/2010 |
| JP | 2011104890 | | 6/2011 |
| JP | 2011132420 | A | 7/2011 |
| JP | 2011207958 | A | 10/2011 |
| JP | 2011212968 | A | 10/2011 |
| JP | 2018002213 | A | 1/2018 |
| KR | 100306320 | | 10/2001 |
| KR | 2003036558 | | 5/2003 |
| KR | 2004017234 | | 2/2004 |
| KR | 101196666 | | 11/2012 |
| MX | 2004008491 | A | 7/2005 |
| MX | 347519 | | 4/2014 |
| RU | 2232781 | C2 | 7/2004 |
| RU | 2254347 | C2 | 6/2005 |
| TW | 393427 | | 6/2000 |
| TW | 200404848 | | 4/2004 |
| TW | M362648 | | 8/2009 |
| TW | 201021747 | A | 6/2010 |
| TW | 201309757 | | 3/2013 |
| WO | 1991013933 | | 9/1991 |
| WO | 9413460 | | 6/1994 |
| WO | 1994013460 | A1 | 6/1994 |
| WO | 9729150 | A1 | 8/1997 |
| WO | 1998016575 | | 4/1998 |
| WO | 9932544 | A1 | 7/1999 |
| WO | 0002800 | | 1/2000 |
| WO | 0119733 | | 3/2001 |
| WO | 0132758 | | 5/2001 |
| WO | 0140374 | A2 | 6/2001 |
| WO | 0153079 | | 7/2001 |
| WO | 0170859 | A2 | 9/2001 |
| WO | 0234824 | | 5/2002 |
| WO | 03076497 | | 9/2003 |
| WO | 03099913 | | 12/2003 |
| WO | 2004104075 | | 12/2004 |
| WO | 2005097878 | | 10/2005 |
| WO | 2006042908 | | 4/2006 |
| WO | 2006124369 | | 11/2006 |
| WO | 2007003523 | A1 | 1/2007 |
| WO | 2007020074 | | 2/2007 |
| WO | 2007068766 | | 6/2007 |
| WO | 2007090845 | A2 | 8/2007 |
| WO | 2008030953 | | 3/2008 |
| WO | 2008038750 | | 4/2008 |
| WO | 2008045944 | | 4/2008 |
| WO | 2008057878 | | 5/2008 |
| WO | 2008080111 | | 7/2008 |
| WO | 2008145267 | | 12/2008 |
| WO | 2009035580 | | 3/2009 |
| WO | 2010006272 | | 1/2010 |
| WO | 2010019146 | | 2/2010 |
| WO | 2010076701 | A1 | 7/2010 |
| WO | 2010111869 | | 10/2010 |
| WO | 2011005856 | | 1/2011 |
| WO | 2011036272 | A2 | 3/2011 |
| WO | 2011038081 | A1 | 3/2011 |
| WO | 2011076637 | | 6/2011 |
| WO | 2011141044 | | 11/2011 |
| WO | 2011144705 | | 11/2011 |
| WO | 2012020106 | A1 | 2/2012 |
| WO | 2012025584 | A1 | 3/2012 |
| WO | 2012044730 | | 4/2012 |
| WO | 2012055797 | | 5/2012 |
| WO | 2012099682 | | 7/2012 |
| WO | 2012173873 | | 12/2012 |
| WO | 2012174422 | | 12/2012 |
| WO | 2013101301 | | 7/2013 |
| WO | 20140066761 | | 5/2014 |

OTHER PUBLICATIONS

Second Mexican Office action for Mexican Patent App. No. MX/a/2016/002374 dated Aug. 2, 2021, 9 pages.

Canadian Office Action for Canadian Patent App. No. 2918306 dated Jul. 28, 2021, BP-423 CA ||, 3 pages.

Dow (TM) HDPE DMDA-8007 NT7 Technical Information, Dow Chemical Company, 2011. (Year: 2011).

Office Action (Non-Final Rejection) dated Jul. 11, 2022 for U.S. Appl. No. 17/410,386 (pp. 1-12).

Mexican Office action for Mexican Patent App. No. MX/a/2016/002374 dated Mar. 3, 2021, 7 pages.

Mexican Office Action for MX/a/2016/002490 dated Jun. 22, 2021, BP-423 MX ||, 8 pages.

First Mexican Office Action for Mexican Patent App. No. MX/a/2015/012702 dated Jun. 23, 2021, BP-405 MX ||, 17 pages, No English translation available.

Unilever Says It Will Use Less Plastic Per Bottle, Yahoo News (Apr. 22, 2014, 10:20 AM), http://news.yahoo.com/unilever-says-less-plastic-per-bottle-142039401-finance.html (3 pages).

Chinese Office Action for Application Serial No. 201480021009.9, dated Aug. 7, 2017 including English language summary, BP-405 CN ||, 12 pages.

Chinese Office Action for Chinese App. No. 201480047976.2 received on Aug. 22, 2017, BP-423 CN ||, 15 pages.

Dongwu Yang, Plastic Material Selection Technology, Light Industry Press, Jan. 2008, 1 page.

Australian First Patent Examination Report for Australian App. No. 2014311991 dated Oct. 4, 2017, BP-424 AU ||, 4 pages.

Office Action dated Oct. 3, 2017 for U.S. Appl. No. 15/491,443; (pp. 1-6).

Office Action dated Oct. 6, 2017 for U.S. Appl. No. 15/383,115; (pp. 1-5).

Office Action dated Oct. 27, 2017 for U.S. Appl. No. 15/239,894; (pp. 1-7).

(56) References Cited

OTHER PUBLICATIONS

Chinese Office Action for Application Serial No. 201480021009.9, dated Januray 2, 2018 including English language summary, BP-405 CN I, 6 pages.
Office Action dated Jan. 17, 2018 for U.S. Appl. No. 15/591,355; (pp. 1-5).
Chinese Office Action for Application Serial No. 201480021009.9, dated Apr. 20, 2018 including English language summary, BP-405 CN I, 6 pages.
First Substantive Examination Report for European App. No. 14768125.8 dated Mar. 21, 2019, BP-405 EP II, 6 pages.
First Examination Report for Indiana Patent App. No. 9302/DELNP/2015 dated May 6, 2019, BP-405 IN II, 7 pages.
Chinese Office Action for Chinese App. No. 20180039581.8 sent Feb. 23, 2018, BP-422 CN II, 13 pages.
Chinese Office Action for Chinese App. No. 20180039581.8 sent Jan. 14, 2019, BP-422 CN II, 10 pages.
Chinese Final Rejection for Chinese App. No. 201480047976.2 received on Mar. 7, 2018, BP-423 CN II, 8 pages.
Chinese Office Action for Chinese App. No. 201480047978.1 received Feb. 24, 2018, BP-425 CN II, 11 pages.
Chinese Office Action for Chinese App. No. 20180042446.9 sent on Feb. 3, 2018, BP-432 CN II, 9 pages.
Chinese Office Action for Chinese App. No. 20180042446.9 sent on Oct. 31, 2018, BP-432 CN II, 5 pages.
Chinese Office Action for Chinese App. No. 201480047578.0 sent on Jan. 24, 2018, BP-424 CN II, 10 pages.
Vasile et al., Practical Guide to Polyethylene, published by Smithers Rapra Press, 2008, p. 119, 3 pages.
Office Action dated Apr. 27, 2018 for U.S. Appl. No. 15/061,005 (pp. 1-7).
Office Action dated Apr. 16, 2018 for U.S. Appl. No. 15/061,070, BP-475 US-U II, (pp. 1-13).
Definition of "Base," Dictionary.com, available at http://www.dictionary.com/browse/base, retrieved on Apr. 16, 2018.
Office Action dated Apr. 20, 2018 for U.S. Appl. No. 15/239,894, BP-422 US-CON1 II, (pp. 1-13).
Office Action dated Jun. 15, 2018 for U.S. Appl. No. 15/491,443, BP-432 US-U II, pp. 1-6.
Lubrizol Advanced Materials, Inc., Extrusion Guide, 2014, 16 pages.
Chinese Office Action for Chinese App. No. 201480047578.0 sent on Aug. 29, 2018, BP-424 CN II, 4 pages.
Office Action dated Sep. 7, 2018 for U.S. Appl. No. 15/239,894, BP422 US-CON II, (pp. 1-9).
Office Action dated Mar. 8, 2019 for U.S. Appl. No. 15/902,489, BP-473 US-CON II, (pp. 1-16).
Chinese Office Action for Chinese App. No. 20180039581.8 sent May 31, 19, BP-422 CN I51 , 7 pages.
Chinese Reexamination Notification for Chinese App. No. 201480047976.2 received on Jul. 15, 2019, BP-423 CN II, 12 pages.
Shunying Wu et al., "Foam Molding" Beijing Chemical Industry Press, Second Edition, Feb. 1999, 16 pages, English translation included.
Dingyi Hong, "Handbook of Plastic Industry: Polyolefin" Beijing Chemical Industry Press, First Edition, Mar. 1999, 17 pages, English translation included.
Shunyang Deng, "Chemical Formulation and Process Manual" Shanghai Science and Technology Press, First Edition, Jan. 2013, 11 pages, English translation included.
Office Action dated Jul. 15, 2019 for U.S. Appl. No. 15/902,489, BP-473 US-CON II, (pp. 1-24).
Office Action dated Jul. 26, 2019 for U.S. Appl. No. 16/149,351, BP-405 US-CON II, (pp. 1-6).
Office Action dated Oct. 4, 2019 for U.S. Appl. No. 15/713,799, BP-432 US-CON II, (pp. 1-5).
Indian First Examination Report for Indian Patent App. No. 201617000386, dated Oct. 16, 2020, BP-422 IN II, 7 pages.
Canadian Office Action for Canadian Patent App. No. 2918306 dated Oct. 30, 2020, BP-423 CA II, 4 pages.
Indian First Examination Report for Indian Patent App. No. 2016/17003143 dated Sep. 11, 2020, BP-423 IN II, 5 pages.
Mexican Office Action for MX/a/2016/002490 dated Oct. 22, 2020, BP-423 MX II, 7 pages.
First Examination Report for Indiana App. No. 201617007243 dated Dec. 16, 2019, BP-425 IN II, 6 pages.
Indian First Examination Report for Indian App. No. 201317001026, dated Mar. 20, 2020, BP-432 IN II, 6 pages.
First Examination Report for Indian App. No. 201617005271, sent Feb. 11, 2020, BP-424 IN II.
Office Action dated Jan. 6, 2020, for U.S. Appl. No. 15/902,489, BP-473 US-CON II, 22 pages.
Office Action dated Jul. 16, 2020 for U.S. Appl. No. 15/902,489, BP-473 US-CON II (pp. 1-20).
Office Action dated Aug. 31, 2020 for U.S. Appl. No. 16/356,423, BP-422 US-CON II (pp. 1-14).
Office Action (Final Rejection) dated Jan. 10, 2023 for U.S. Appl. No. 17/410,386, BP-527 US-U II (pp. 1-12).
Office Action (Non-Final Rejection) dated Jun. 20, 2023 for U.S. Appl. No. 17/410,386 , BP-527 US-U II (pp. 1-18).
Office Action (Non-Final Rejection) dated Sep. 8, 2023 for U.S. Appl. No. 17/075,183 (pp. 1-11).
Office Action (Final Rejection) dated Feb. 8, 2024 for U.S. Appl. No. 17/075,183, BP-473 US-CON II (pp. 1-9).
Office Action (Final Rejection) dated Nov. 15, 2023 for U.S. Appl. No. 17/410,386, BP-527 US-U II (pp. 1-19).
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 mailed Feb. 28, 2017, 16 pages.
New Zealand First Examination Report for New Zealand Application 708546 received Feb. 23, 2017, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action mailed Mar. 10, 2017 for Chinese Patent Application 201480007369.3, 11 pages.
New Zealand Examination Report for New Zealand Application No. 708463 received Mar. 16, 2017, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 mailed Feb. 23, 2017, 6 pages.
Office Action dated Apr. 7, 2017 for U.S. Appl. No. 14/063,252.
Chinese Office Action for Chinese Application No. 201380065127.5 sent on Apr. 1, 2017, 14 pages.
Japanese Office Action for Japanese Application No. 2014-515882, dispatched Apr. 4, 2017, 6 pages.
New Zealand Examination Report for New Zealand Application No. 708552 received on Mar. 29, 2017, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 mailed Apr. 5, 2017, 12 pages.
Chinese Office Action for Chinese App. No. 201380065089.3 received Apr. 21, 2017, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Jun. 7, 2017 for U.S. Appl. No. 15/388,319; (pp. 1-21).
Chinese Office Action for Chinese Application No. 201280051426.9 received May 15, 2017, 12 pages.

(56) References Cited

OTHER PUBLICATIONS

Chinese Office Action for Chinese App. No. 201380041896.1 mailed May 22, 2017, 9 pages.
Taiwan Office Action for Taiwan App. No. 101121655 received Jun. 14, 2017, 29 pages.
Australian Examiner's Report for Australian App. No. 2014244210 received Jun. 16, 2017, 4 pages.
European Examination Report for European App. No. 13863308.6 sent May 17, 2017, 3 pages.
Extended European Search Report for European App. No. 14836418.5 mailed Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 sent Jun. 6, 2017, 19 pages.
New Zealand Examination Report for New Zealand Application 708546 received Jul. 11, 2017, 2 pages.
Office Action dated Jul. 19, 2017 for U.S. Appl. No. 15/004,263; (pp. 1-17).
European Examination Report for European App. No. 13849152.7 sent Jun. 29, 2017, 4 pages.
Taiwan Office Action for Taiwan App. No. 102138786 received on Aug. 9, 2017, 25 pages.
Office Action dated Aug. 22, 2017 for U.S. Appl. No. 14/188,504; (pp. 1-9).
Australian Examination REport for Australian App. No. 2016204692 received Aug. 15, 2017, 3 pages.
German Office Action for German App. No. 11 2012 002 042.1 received on Sep. 8, 2017, 20 pages.
Chinese Office Action mailed Sep. 21, 2017 for Chinese Patent Application 201480007369.3, 4 pages.
Taiwan Office Action for Taiwan Pat. App. No. 101121656 mailed Aug. 1, 2017, 16 pages.
Office Action dated Oct. 18, 2017 for U.S. Appl. No. 14/063,252; (pp. 1-17).
Chinese Office Action for Chinese Application No. 201380065127.5 sent on Sep. 27, 2017, 19 pages.
Office Action dated Oct. 26, 2017 for U.S. Appl. No. 15/139,573; (pp. 1-8).
Office Action dated Nov. 2, 2017 for U.S. Appl. No. 15/650,424; (pp. 1-6).
Extended European Search Report for European App. No. 17182869.2 sent on Oct. 19, 2017, 5 pages.
Extended European Search Report for European App. No. 17181231.6 sent on Nov. 7, 2017, 5 pages.
Office Action dated Nov. 14, 2017 for U.S. Appl. No. 14/862,552; (pp. 1-14).
Borealis HC600TF, 2008, 3 pages.
Borealis HC205TF, 2007, 3 pages.
Isplen codes, available at least by May 28, 2018, 1 page.
Quimica Chemicals—Isplen Polypropylene Compounds, brochure Apr. 2010, 20 pages.
Rychly, J. et al., "The effect of physical parameters of isotactic polypropylene on its oxidisability measured by chemiluminescence method. Contribution to the spreading phenomenon" Polymer Degradation and Stability, vol. 71, No. 2, 2001, 8 pages.
Tiemblo, P. et al., "The autoacceleration of polypropylene thermo-oxidation in reduced coordinates: effect of the oxidation temperature and of polyolefin structure" Polymer Degradation and Stability, vol. 72, No. 1, 2001, 8 pages.
Bezati, F. et al., "Addition of tracers into the polypropylene in view of automatic sorting of plastic wastes using X-ray fluorescence spectrometry" Waste Management, vol. 30, No. 4, May 2010, 6 pages.
Translation of CN101560307A, 19 pages.
Gotsis, A. D. et al., "The Effect of Long Chain Branching on the Processability of Polypropylene in Thermoforming" Polymer Engineering and Science, vol. 44, No. 5, May 2004, 10 pages.
"Product News" Daploy WB135HMS—High Melt Strength Polyproyplene for Foam Extrusion, 2004, 2 pages.
Naguib, Hani E. et al., "Effects of Blending of Branched and Linear Polypropylene Materials on the Foamability" Technical Papers of the Annual Technical Conference-Society of Plastics Engineers Incorporated, 2001, 8 pages.
Antunes, Marcelo et al., "Heat Transfer in Polypropylene-Based Foams Produced Using Different Foaming Processes" Advanced Engineering Materials, vol. 11, No. 1 0, May 2009, 7 pages.
R0hne Gunhild. Foaming of Soft Polyproyplene Blends. Conference Proceedings: Zlin Czech Republic, Aug. 16-18, 2000, 4 pages.
Mikell Knights, "Theres Plenty of Fizz in Foam Blow Molding" Plastics Technology, available from https:llwww.ptonline.com/articles/there%27s-plenty-of-fizz-in-foam-blow-molding, 1999, 4 pages.
Crodamide brochure 02/00, 4 pages.
Tabatabaei, Seyed H. et al., "Rheological and thermal properties of blends of a long-chain branched polypropylene and different linear polypropylenes" Chemical Engineering Science, vol. 64, No. 22, 2009, 13 pages.
Stange, Jens et al., "Rheological properties and foaming behavior of polypropylenes with different molecular structures" Journal of Rheology, vol. 50, No. 6, 2006, 18 pages.
Clariant, Cesa Slip, Sep. 2000, 6 pages.
Antunes, Marcelo et al., "Study of the cellular structure heterogeneity and anisotropy of polypropylene and polypropylene nanocomposite foams" Polymer Engineering and Science, vol. 49, No. 12, May 2009, 14 pages.
Office Action dated Jun. 22, 2018 for U.S. Appl. No. 15/004,263 (pp. 1-20).
Shutov, Fyodor, "Foamed Polymers. Cellular Structure and Properties", Springer Berlin Heidelberg, Industrial Developments vol. 51, Jun. 2005, p. 176-182, 8 pages.
Canadian office action for Canadian App. No. 2842325 dated Oct. 26, 2018, 4 pages.
First Examination Report for Indian Patent App. No. 111/DELNP/2014 dated Apr. 22, 2019, 7 pages.
First Examination Report for Indian Patent App. No. 110/DELNP/2014 sent on Dec. 26, 2019, 8 pages.
Taiwan Office Action for Taiwan App. No. 102146298 sent Oct. 26, 2016, 9 pages.
Canadian Examiner's Report for Canadian App. No. 2845225 dated Mar. 1, 2019, 3 pages.
Canadian Examiner's Report for Canadian App. No. 2845225 dated Nov. 18, 2019, 4 pages.
Canadian Examiner's Report for Canadian App. No. 2845225 dated Dec. 2, 2020, 4 pages.
Borealis Product Brochure, "DaployTM HMS Polypropylene for Foam Extrusion", 20 pages, 2010.
Canadian Examiner's Reprot for Canadian App. No. 2845225 dated Jun. 23, 2021, 4 pages.
Re-examination Notification for Chinese Patent App. No. 201280051426.9 received on Feb. 11, 2019, 19 pages.
Second Re-examination Notification for Chinese Patent App. No. 201280051426.9 received on Oct. 8, 2019, 21 pages.
German Office Action for German App. No. 11 2012 00 070.2 dated Oct. 20, 2020, 23 pages.
German Office Action for German App. No. 11 2012 00 070.2 dated Sep. 30, 2021, 7pages, (No. English Translation Available).
Borealis: Product Data Sheet: Polypropylene Daploytm WB 140 HMS (Mar. 16, 2021), 2 pages.
English Translations of German Office Action for German App. No. 11 2012 00 070.2 dated Sep. 30, 2021, 6 pages.
German Office Action for German App. No. 11 2012 00 070.2 dated Dec. 23, 2022, 12 pages, (No. English Translation Available).
Zweifel, Hans, "Plastics Additives Handbook" Carl Hanser Verlag, 2001, 6 pages.
Examination Report for GB1405600.6 dated Oct. 15, 2019, 4 pages.
Indian First Examination Report for Indian Pat. App. No. 2179/DELNP/2014 date May 24, 2019, 6 pages.
Chinese Rejection Decision for Chinese App. No. 201380065781.6 dated Jul. 12, 2018, 15 pages, (No. English Translation available).
English Summary of Chinese Rejection Decision for Chinese App. No. 201380065781.6 dated Jul. 12, 2018, 4 pages.
Indian Examination Report for Indian App. No. 3919/DELNP/2015, sent Aug. 21, 2018, 5 pages.

(56) References Cited

OTHER PUBLICATIONS

Markus Gahleitner et al., "Heterophasic Copolymers of Polypropylene: Development, Design, Principles, and Future Challenges," Journal of Applied Polymer Science, 2013, Wiley Periodicals, 10 pages.
Sadiqali Cheruthazhekatt et al., "Multidimensional Analysis of the Complex Composition of Impact Polypropylene Copolymers: Combination of TREF, SEC-FTIR-HPer DSC, and High Temperature 2D-LC," Macromolecules 2012, 45, 2025-2305, ACS Publications, American Chemcial Society, 10 pages.
Office Action dated Sep. 26, 2018 for U.S. Appl. No. 15/651,284, (pp. 1-10).
Substantive Examination Report for European App. No. 17182869.2 sent on Nov. 12, 2018, 5 pages.
Office Action dated Dec. 6, 2018 for U.S. Appl. No. 15/388,319, (pp. 1-10).
Office Action dateed Dec. 13, 2018 for U.S. Appl. No. 15/672,668, (pp. 1-13).
Office Action dated Jan. 14, 2019 for U.S. Appl. No. 15/004,263, (pp. 1-15).
Office Action dated Aug. 11, 2016 for U.S. Appl. No. 14/108,110.
Chinese Office Action mailed Aug. 3, 2016 for Chinese Patent Application 201480007369.3, 13 pages.
M. Antunes et al., 'Heat Transfer in Polyolefin Foams,' Heat Transfer in Multi-Phase Materials, A. Ochsner and G. E. Murch, Eds. Springer-Verlag Berlin Heidelberg, 2011, 131-161.
Office Action dated Sep. 1, 2016 for U.S. Appl. No. 14/106,212.
Australian First Patent Examination Report for Application No. 2013359097 sent Aug. 26, 2016, 3 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,319.
Office Action dated Oct. 7, 2016 for U.S. Appl. No. 14/739,510.
Japanese Office Action for Japanese Application No. 2014-515882, dispatched Aug. 30, 2016, 6 pages.
Mexican Office Action for Mexican Application MX/a/2013/014993 received on Sep. 27 2016, 6 pages.
New Zealand Examination Report for New Zealand Application No. 708463 received Oct. 3, 2016, 3 pages.
New Zealand Examination Report for New Zealand Application No. 708552 received on Oct. 7, 2016, 4 pages.
New Zealand First Examination Report for New Zealand Application 708546 received Sep. 26, 2016, 4 pages.
Russian Office Action for Russian Application No. 2014101298 received Sep. 30, 2016, 6 pages.
European Examination Report for European App. No. 12727994.1 received on Sep. 23, 2016, 4 pages.
Chinese Office Action for Chinese App. No. 201380065089.3 received Sep. 30, 2016, 12 pages.
European Search Report for European App. No. 13849152.7 received Sep. 16, 2016, 3 pages.
Australian Patent Examination Report for Australian App. No. 2013334155 issued on Oct. 24, 2016, 7 pages.
Taiwan Office Action for Taiwan Pat. App. No. 102146299 received on Oct. 21, 2016, 7 pages.
Third Party Observation filed in European Patent App. No. 12727994.1 received on Nov. 4, 2016, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 received Oct. 12, 2016, 4 pages.
British Examination Report for GB App. No. 1400762.9 received Oct. 12, 2016, 2 pages.
Chinese Office Action for Chinese Applicaiton 201380065781.6 received Oct. 18, 2016, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3 received Sep. 27, 2016, 9 pages.
Office Action dated Nov. 4, 2016 for U.S. Appl. No. 13/961,411.
Chinese Office Action for Chinese Application No. 201280051426.9 received Nov. 1, 2016, 9 pages.
English Summary of Chinese Office Action for Application Serial No. 201380041896.1, dated Nov. 11, 2016, 11 pages.
Extended European Search Report for European App. No. 14775300.8 sent Oct. 24, 2016, 9 pages.
Office Action dated Nov. 18, 2016 for U.S. Appl. No. 14/718,836.
Office Action dated Dec. 22, 2016 for U.S. Appl. No. 14/858,158.
Gulf Cooperation Council Examination Report for GCC Patent App. No. GC2012-21529 received on Nov. 14, 2016, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025 received Dec. 23, 2016, 5 pages.
Japanese Office Action for Japanese Patent App. 2014-516089 sent Dec. 20, 2016, 6 pages.
European Examination Report for European App. No. 12727994.1 received on Jan. 25, 2016, 4 pages.
Japanese Office Action for Japanese App. No. 2014-528384 received Dec. 6, 2016, 15 pages.
Singapore Office Action and Written Opinion received Feb. 6, 2017 for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Aug. 18, 2015 for U.S. Appl. No. 14/106,212.
Office Action dated Aug. 27, 2015 for U.S. Appl. No. 14/106,358.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
Certified English translation of JP2003292663.
Second Chinese Office Action dated Sep. 6, 2015 for Chinese Application Serial No. 201280034350.9.
Office Action dated Oct. 8, 2015 for U.S. Appl. No. 14/188,504.
Office Action dated Oct. 27, 2015 for U.S. Appl. No. 14/462,073.
English translation of Russian Office Action for Application Serial No. 2015127677, dated Sep. 16, 2015.
Inter Partes Review Petition for US. Pat. 8,883,280 (712 pages) [Submitted in multiple parts].
Gibson and Ashby, Cellular solids: structure and properties, 2nd ed., Cambridge University Press (1997) (7 pages).
C. Maier and T. Calafut, Polypropylene: the Definitive User's Guide and Databook, Plastics Design Library, William Andrew Inc. (1998) (19 pages).
Grant & Hackh's Chemical Dictionary, 5th ed., McGraw-Hill, Inc. (1987) (3 pages).
Merriam-Webster's Collegiate Dictionary, 11th ed. (2003), p. 70 (3 pages).
Merriam-Webster's Collegiate Dictionary, 11th ed. (2003), p. 1237 (3 pages).
Hawley's Condensed Chemical Dictionary, 14th Ed. (2001) (5 pages).

(56) References Cited

OTHER PUBLICATIONS

Reichelt et al., Abstract of PP-Blends with Tailored Foamability and Mechanical Properties, Cellular Polymers, (2003) available from http://www.polymerjournals.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly™ HMS Polypropylene for Foam Extrusion" obtained from Borealis webpage obtained from the Internet Archive's "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf)("Brochure '08") (20 pages).
Office Action dated Dec. 31, 2015 for U.S. Appl. No. 14/755,546.
Office Action dated Jan. 11, 2016 for U.S. Appl. No. 14/161,328.
Singapore Notice of Eligibility for Grant, Search Report, and Examination Report transmitted Dec. 10, 2015 for Singapore Application No. 11201503336V.
English translation of First Office Action for Taiwanese Application No. 101121656, Nov. 13, 2015.
English summary of Spanish Office Action for Application Serial No. P201490025, Feb. 9, 2016, 8 pages.
Extended European Search Report for European Application No. 13849152.7-1303/2912142 PCT/US2013/066811, dated Feb. 12, 2016.
Office Action dated Feb. 16, 2016 for U.S. Appl. No. 14/108,142.
United Kingdom Examination Report for Patent Application No. GB1400762.9 dated Feb. 11, 2016.
English Summary of Russian Office Action for Application Serial No. 2014111340, dated Feb. 25, 2016, 8 pages.
Supplemental European Search Report for European Application No. 12727994.1-1302, dated Feb. 17, 2016.
Australian First Patent Examination Report for Application No. 2012271047, dated Feb. 29, 2016.
Extended European Search Report for European Application No. 13827981.5-1708/2888092 PCT/US2013/053935, dated Feb. 19, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
English Summary of Chinese Office Action for Application Serial No. 201380041896.1, dated Mar. 18, 2016, 7 pages.
International Preliminary Report on Patentability dated Feb. 16, 2016, relating to International Application No. PCT/US2014/051508.
Australian Second Patent Examination Report for Application No. 2012302251, dated Feb. 26, 2016.
Japanese Office Action for Japanese Patent Application No. 2014-528384, dated Mar. 1, 2016.
English summary of Mexican Office Action for Application Serial No. MX/a/2013/014993, Apr. 27, 2016, 5 pages.
English summary of Chinese Office Action for Chinese Application Serial No. 201380065781.6, Apr. 19, 2016, 14 pages.
Doerpinghaus et al., 'Separating the effects of sparse long-chain branching on rheology from those due to molecular weight in polyethylenes', Journal of Rheology, 47, 717 (2003).
English Summary of Chinese Office Action for Application Serial No. 201280051426.9, Apr. 29, 2016, 5 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daploy-hmspp-extruded-foam/).
Reichelt et al., 'PP-Blends with Tailored Foamability and Mechanical Properties', Cellular Polymers, vol. 22, No. 5, 2003, 14 pages.
Ratzsch et al., 'Radical reactions on polypropylene in the solid state', Prog. Polym. Sci. 27 (2002) 1195-1282, 88 pages.
Excerpts from Encyclopedia of Polymer Science and Technology: Plastics, Resins, Rubbers, and Fibers, 'Blowing Agents', vol. 2, John Wiley & Sons, Inc. (1965), 37 pages.
Excerpts from Polymer Foams: Science and Technology, Lee et al., 'Introduction to Polymeric Foams', CRC Press (2007) 51 pages.
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
"All You Need to Know About Polypropylene, Part 1," Creative Mechanisms Blog. (Year: 2016).
Rejection Decions for Chinese Patent App. No. 201280051426.9 received on Nov. 14, 2017, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.
ASTM D4101-11, an American Society for Testing and Materials "Standard Standard Specification for Polypropylene Injection and Extrusion Materials," 2011, 17 pages.
Chinese Office Action for Chinese App. No. 201380065781.6 dated Nov. 28, 2017, 10 pages.
European Examination Report for European App. No. 13849152.7 sent Jan. 4, 2018, 3 pages.
Office Action dated Jan. 16, 2018 for U.S. Appl. No. 15/388,319; (pp. 1-13).
Office Action dated Jan. 19, 2018 for U.S. Appl. No. 15/004,263; (pp. 1-18).
Extended European Search Report for European App. No. 14836418.5 mailed Jan. 30, 2018, 4 pages.
Canadian office action for Canadian App. No. 2,842,325 dated Jan. 24, 2018, 4 pages.
Japanese Office Action for Japanese App. No. 2016-501945 sent Jan. 23, 2018, 17 pages.
Canadian Examiner's Report for Canadian App. No. 2845225 dated Feb. 6, 2018, 5 pages.
Taiwan Office Action for Taiwan App. No. 103128338 received on Feb. 21, 2018, 9 pages.
Japanese Office Action for Japanese Patent App. No. 2015-539838 sent Feb. 27, 2018, 10 pages.
Taiwan Office Action for Taiwan App. No. 102138786 received on Mar. 1, 2018, 20 pages.
Chinese Office Action mailed Mar. 22, 2018 for Chinese Patent Application 201480007369.3, 5 pages.
Office Action dated Mar. 29, 2018 for U.S. Appl. No. 14/862,552, (pp. 1-10).
Chinese Office Action for Chinese Application No. 201380065127.5, sent on Jul. 26, 2016, 11 pages.
Taiwan Office Action for Taiwan App. No. 101121655 received Apr. 25, 2018, 6 pages, (No. English translation available).
"All you need to know about Polypropylene, Part 1," Creative Mechanisms. (Year: 2017), 6 pages.
"Polypropylene, Impact Copolymer," Lyondell Basell. (Year: 2017).
Australian Notice of Acceptance for Australian App. No. 2016204692 received on Apr. 3, 2018, 3 pages.
First Substantive Examiantion Report for European App. No. 14775300.8 sent Apr. 6, 2018, 4 pages.
Office Action dated Jun. 6, 2018 for U.S. Appl. No. 15/388,319 (pp. 1-19).

(56) References Cited

OTHER PUBLICATIONS

Notice of Opposition for EP2751194 submitted May 28, 2018, 11 pages.
Grounds of Opposition for EP2751194 submitted May 28, 2018, 40 pages.
Pasquini, Nello, "Polypropylene Handbook," Carl Hanser Verlag, 2005, 7 pages.
Himont, Pro-fay PF814 brochure, 1992, 1 page.
Maier et al., "Polypropylene: The Definitive User's Guide and Databook" Plastics Design Library, 1998, 19 pages.
Gachter et al., "Taschenbuch der Kunststoff-Additive" Carl Hanser Verlag, 1983, 17 pages, (No. English translation available).
Wypych, "Handbook of Antiblocking, Release, and Slip Additives" ChemTec Publishing, 2011, 10 pages.
Wiesner et al. "The Right Chemical Foaming Agent for Your Application" The Sixth International Conference "Blowing Agents and Foaming Processes 2004", 11 pages.
Hydrocerol—Chemical Foaming and Nucleating Agents, 2007, 8 pages.
Montell at K98—presentation of extrusion line, 1998, 2 pages.
Montell Polyolefins "PP meets foam in sheet—Pro-fax PF-814 paves the way to PP foam growth", available at least by May 28, 2018, 4 pages.
Glossary of Terms for the chemical Fabrics & Film Industry, available at least by May 28, 2018, 5 pages.
ASTM D 883-08, Standard Terminology Relating to Plastics, 2008, 15 pages.
ASTM D 1922-93, Standard Test Method for Propagation Tear Resistance of Plastic Film and Thin Sheeting by Pendulum Method, 1993, 5 pages.
ASTM D3763-02, Standard Test Method for High Speed Puncture Properties of Plastics Using Load and Displacement SEnsors, 2002, 10 pages.
Tolinski, "Additives for Polyolefins: Getting the Most Out of Polypropylene, Polyethylene, and TPO" Elsevier, 2009, 25 pages.
Borealis, DaployTM HMS Polypropylene for Foam Extrusion, 2007, 20 pages.
Borealis, DaployTM HMS Polypropylene for Foam Extrusion, 2010, 20 pages.
Documents from Inter Parte Review of U.S. Pat. No. 8,883,280, entered Jan. 26, 2016, 26 pages.
Clarian, Technical Product Information "Hydrocerol CF40E", 2004, 1 page.
Clariant, Technical Product Information "Hydrocerol CF20E", 2004, 6 pages.
Clariant, Data sheet Hydrocerol CT516, 2004, 5 pages.
Jan-Erik Wegner, Affidavit regarding Hydrocerol, available at least by May 28, 2018, 22 pages.
Office Action dated Mar. 7, 2019 for U.S. Appl. No. 16/023,218, (pp. 1-5).
Rogers, "All you Need to Know About Polypropylene, Part 1," Creative Mechanisms Blog. (Year: 2014), 6 pages.
Office Action dated Aril 2, 2019 for U.S. Appl. No. 15/388,319, (pp. 1-17).
Office Action dated Apr. 30, 2019 for U.S. Appl. No. 15/004,263 (pp. 1-10).
Office Action dated Apr. 5, 2019 for U.S. Appl. No. 15/651,284, pp. 1-5.
Notice to Attend Hearing for Indian Patent App. No. 2179/DELNP/2014 dated Aug. 17, 2020, 2 pages.
Mexican Office Action for Mexican App. No. MX/a/2014/002373 issued Jul. 1, 2019, 7 pages.
ISO, "Plastics—Determination of drawing characteristics of thermoplastics in the molten state", ISO, First edition, Jun. 15, 2005, 22 pages.
Mexican Office Action for Mexican App. No. MX/a/2014/002373 issued Mar. 6, 2020, 10 pages.
Third Mexican Office Action for Mexican App. No. MX/a/2014/002373 issued Jan. 8, 2021, 9 pages.
Fourth Mexican Office Action for Mexican App. No. MX/a/2014/002373 received Nov. 2, 2021, 5 pages.
Canadian Examiner's Report and Examination Search Report for Canadian App. No. 2,889,280, dated Apr. 14, 2020, 5 pages.
Canadian Examiner's Report and Examination Search Report for Canadian App. No. 2,889,280, dated Oct. 27, 2020, 4 pages.
Mexican Office Action for Mexican Patent App. No. MX/a/2015005207 dated Jul. 22, 2020, 5 pages.
Examination Report for Indian Patent App. No. 5758/DELNP/2015 dated Aug. 28, 2019, 7 pages.
First Examination Report for Indian App. No. 5756/DELNP/2015 dated Dec. 12, 2019, 5 pages.
First Examination Report for Indian App. No. 5804/DELNP/2015, sent Aug. 5, 2019, 7 pages.
Indian First Examination Report for Indian Application No. 8947/DELNP/2015 dated Jul. 18, 2019, 7 pages.
Office ACtion dated Oct. 18, 2019 for U.S. Appl. No. 16/546,723, (pp. 1-6).
Office Action dated Nov. 29, 2019 for U.S. Appl. No. 15/651,284, (pp. 1-6).
Lyondellbasell Technical Data Sheet for Pro-fax SC204 dated Mar. 17, 2016, 3 pages.
Canadian Examiner's Report for Canadian App. No. 2896256, dated Feb. 6, 2020, 4 pages.
Canadian Examiner's Second Report for Canadian App. No. 2896256, dated Dec. 2, 2020, 4 pages.
Canadian Examiner's Third Report for Canadian App. No. 2896256, dated Aug. 5, 2021, 4 pages.
Hearing Notice for Indian Application No. 8947/DELNP/2015 dated Jul. 23, 2020, 3 pages.
Notice of Appeal Decision for Japanese App. No. 2016-501945 sent Aug. 18, 2020, 15 pages.
First Mexican Office Action for Mexican Patent App. No. MX/a/2015/008525 dated Nov. 5, 2020, 17 pages.
First Mexican Office Action for Mexican Patent App. No. MX/a/2015/008525 dated May 3, 2021, 11 pages.
Korean Notice of Preliminary Rejection for Korean Pat. App. No. 10-2015-7021888 dated Apr. 21, 2020, 11 pages.
Korean Second Notice of Preliminary Rejection for Korean Pat. App. No. 10-2015-7021888 dated Dec. 29, 2020, 16 pages.
Korean Notice of Last Preliminary Rejection for Korean Pat. App. No. 10-2015-7021888 dated Sep. 5, 2021, 9 pages.
Office Action dated Jun. 12, 2020 for U.S. Appl. No. 15/651,284, (pp. 1-8).
Japanese Office Action for Japanese Patent App. No. 2019-045572 date Jan. 14, 2020, 6 pages.
Office Action dated Apr. 27, 2020 for U.S. Appl. No. 16/058,126, (pp. 1-12).
Office Action dated Jun. 23, 2020 for U.S. Appl. No. 16/058,131 , (pp. 1-8)
Office Action dated Sep. 3, 2020 for U.S. Appl. No. 16/858,778 (pp. 1-10).
Office Action dated Sep. 30, 2020 for U.S. Appl. No. 16/058,126, (pp. 1-11).
Office Action dated Sep. 30, 2020 for U.S. Appl. No. 16/531,530, (pp. 1-10).
Japanese Office Action for Japanese Patent App. No. 2019-045572 dated Oct. 30, 2020, 6 pages.
Office Action dated Dec. 24, 2020 for U.S. Appl. No. 16/058,131, (pp. 1-17).
Office Action dated Jan. 25, 2021 for U.S. Appl. No. 16/058,126, (pp. 1-13).
Combined Search and Examination Report for Great Britain App. No. GB2010642.3 dated Mar. 31, 2021, 3 pages.
Japanese Office Action for Japanese Patent App. No. 2019-045572 dated Apr. 13, 2021, 6 pages.
Office Action dated Jun. 8, 2021 for U.S. Appl. No. 16/058,126, (pp. 1-16).
Indian First Examination Report for Indian App. No. 201918021005 dated Dec. 24, 2021, 7 pages.
Chinese Office Action for Chinese App. No. 202010558511.0 dated Jul. 20, 2022, 11 pages.

(56) References Cited

OTHER PUBLICATIONS

Chinese Rejection Decision Action for Chinese App. No. 202010558511.0 dated Feb. 16, 2023, 7 pages.
Canadian Examiner's Report for Canadian App. No. CA3170958 dated (Oct. 27, 2023), 4 pages.
Office Action (Non-Final Rejection) dated Oct. 27, 2022 for U.S. Appl. No. 17/528,650, (pp. 1-19).
Office Action (Non-Final Rejection) dated Dec. 8, 2022 for U.S. Appl. No. 17/136,628, (pp. 1-20).
Office Action (Non-Final Rejection) dated Dec. 8, 2022 for U.S. Appl. No. 17/363,551, (pp. 1-19).
Office Action dated Apr. 27, 2023 for U.S. Appl. No. 17/136,628, (pp. 1-23).
Office Action (Non-Final Rejection) dated Apr. 27, 2023 for U.S. Appl. No. 17/136,628 (pp. 1-22).
Office Action (Final Rejection) dated Apr. 21, 2023 for U.S. Appl. No. 17/528,650, (pp. 1-20).
Office Action (Final Rejection) dated May 4, 2023 for U.S. Appl. No. 17/363,551 (pp. 1-19).
Office Action (Final Rejection) dated Sep. 7, 2023 for U.S. Appl. No. 17/136,628 (pp. 1-24).
Office Action (Non-Final Rejection) dated Sep. 13, 2023 for U.S. Appl. No. 17/363,551 (pp. 1-16).
Office Action (Non-Final Rejection) dated Sep. 20, 2023 for U.S. Appl. No. 17/366,728 (pp. 1-12).
Office Action (Final Rejection) dated Jan. 8, 2024 for U.S. Appl. No. 17/366,728, (pp. 1-16).
Office Action (Non-Final Rejection) dated Feb. 20, 2024 for U.S. Appl. No. 17/136,628, (pp. 1-13).
Extended European Search Report for European Patent App. No. EP21862640.6 received on Jul. 24, 2024, 6 pages.
Canadian Examiner's Report for Canadian App. No. 3013576 dated Aug. 15, 2024, 5 pages.
Canadian Office Action for Canadian App. No. CA3,013,585 dated Nov. 18, 2024, 5 pages.
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Daploy HMS Polypropylene for Foam Extrusion, 20 pages, BOREALIS Borouge Shaping the Future with Plastics, Published 2010, www.borealisgroup.com, www.borouge.com, Vienna, Austria.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jan. 19, 2015, relating to International Application No. PCT/US2014/059312.
International Search Report and Written Opinion dated Jul. 3, 2014, relating to International Application No. PCT/US2014/025697.
International Search Report dated Feb. 26, 2013, relating to International Application No. PCT/US2012/043018.
International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of EP0086869.
Machine English translation of JP 2006-130814.
Naguib et al., "Fundamental Foaming Mechanisms Governing the vol. Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 19, 2014 for Chinese Application No. 201280035667.4.
Office Action dated Aug. 21, 2014 for U.S. Appl. No. 13/526,454.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640.
Office Action dated Oct. 10, 2014 for U.S. Appl. No. 14/106,358.
Office Action dated Oct. 16, 2014 for U.S. Appl. No. 14/106,212.
Office Action dated Sep. 25, 2014 for U.S. Appl. No. 13/526,417.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP's Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Office Action Chinese Patent Application No. 201280051426.9 dated Jul. 23, 2015.
Office Action dated May 19, 2015 for Chinese Application No. 201280035667.4.
ASTM D3763-86, an American Society for Testing of Materials (ASTM), 'Standard Method for High-Speed Puncture Properties of Plastics Using Load and Displacement Sensors' (1986 Edition), 5 pages.
ASTM D1922-93, an American Society for Testing of Materials (ASTM), "Standard Method for Propagation Tear Resistance of Plastic Film And Thin Sheeting by Pendulum Method" (1993 Edition), 5 pages.

(56) References Cited

OTHER PUBLICATIONS

Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., 'Applicability of the Transient Plane Source Method To Measure the Thermal Conductivity of Low-Density Polyethylene Foams', Journal of Polymer Science: Part B: Polymer Physics, vol. 42 (2004), 1226-1234.
The Burn Foundation, 'Scald Burns', available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
'Power of a Microwave Oven', available at https://web.archive.org/web/20071010183358/http://hypertextbook.com/facts/2007/TatyanaNektalova.shtml, dated Oct. 10, 2007, accessed on Feb. 5, 2016.
Health Physics Society, 'Microwave Oven Q & A', available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., 'Heat Transfer in Polypropylene-Based Foams Produced Using Different Foaming Processes', Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry's Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
Third Party Submission Under 37 CFR 1.290 filed on May 12, 2016 in U.S. Appl. No. 14/739,510.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
English translation of Japanese Office Action for Japanese Application No. 2014-516089, dated May 10, 2016.
Office Action dated Mar. 10, 2016 for U.S. Appl. No. 14/462,073.
Office Action dated Jun. 10, 2016 for U.S. Appl. No. 14/188,504.
Singapore Office Action and Written Opinion dated May 27, 2016 for Singapore Application No. 11201504327V.
Singapore Office Action and Written Opinion dated May 27, 2016 for Singapore Application No. 11201504330U.
Notice of Acceptance dated Jun. 10, 2016 for Australian Application No. 2012302251.
Singapore Office Action and Written Opinion dated May 26, 2016 for Singapore Application No. 11201504333Y.
Office Action for Chinese Patent Application No. 201380064860.5, dated Jun. 2, 2016 including English language summary, 13 pages.
Australian First Patent Examination Report for Application No. 2012363114, dated Jun. 15, 2016, 4 pages.
Office Action dated Jun. 30, 2016 for U.S. Appl. No. 14/106,276.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Australian First Patent Examination Report for Application No. 2013334155, dated May 23, 2016, 4 pages.
Office Action for Chinese Patent Application No. 201380065116.7, dated Jun. 28, 2016, including English language summary, 12 pages.
Office Action dated Jul. 28, 2016 for US App. #U.S. Appl. No. 14/211,553.
British Examination Report for GB Application No. GB1400762.9, sent on Aug. 8, 2016, 2 pages.
Extended European Search Report for European Application No. 13863546.1 established Jul. 12, 2016, 7 pages.
Extended European Search Report for European Application No. 13863308.6 mailed Jul. 19, 2016, 8 pages.
International (PCT) Search Report and Written Opinion for PCT/US21/47516 dated Jan. 24, 2022, 22 pages.
Office Action (Non-Final Rejection) dated Nov. 25, 2024 for U.S. Appl. No. 17/363,551 (pp. 1-19).
Canadian Examiner's Report for Canadian App. No. CA3170958 dated (Nov. 6, 2024), 5 pages.
Office Action (Non-Final Rejection) dated Dec. 31, 2024 for U.S. Appl. No. 18/406,730 (pp. 1-24).
Office Action (Non-Final Rejection) dated Jan. 15, 2025 for U.S. Appl. No. 18/639,437, (pp. 1-13).

* cited by examiner

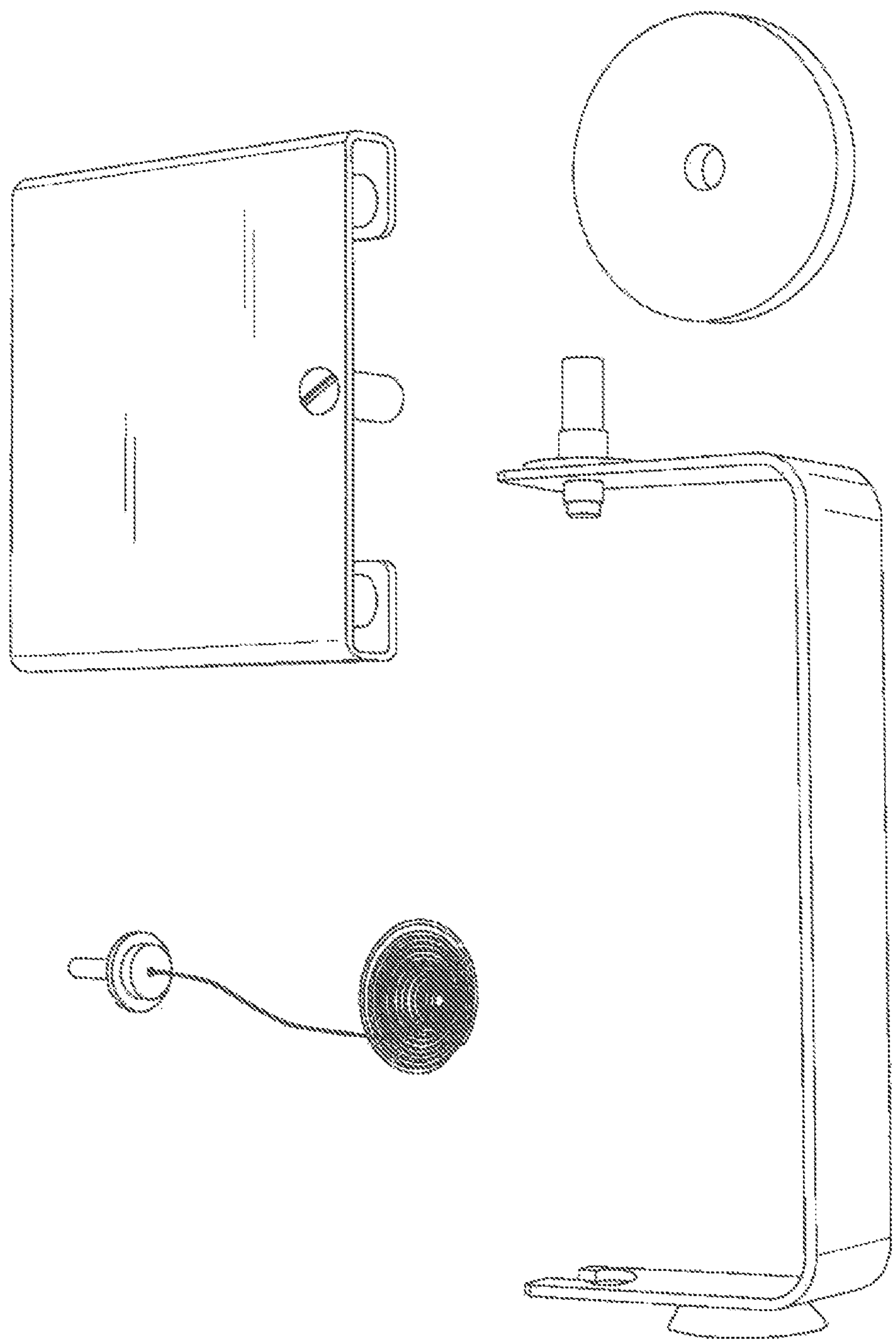

POLYMERIC MATERIAL FOR CONTAINER

PRIORITY CLAIM

This application is a continuation of U.S. application Ser. No. 17/005,585, filed Aug. 28, 2020, which is a continuation of U.S. application Ser. No. 15/713,799, filed Sep. 25, 2017, which is a continuation of U.S. application Ser. No. 14/468,789, filed Aug. 26, 2014, which claims priority under 35 U.S.C. § 119(e) to U.S. Provisional Application Ser. No. 61/869,928, filed Aug. 26, 2013, each of which is expressly incorporated by reference herein.

BACKGROUND

The present disclosure relates to polymeric materials that can be formed to produce a container, and in particular, polymeric materials that insulate. More particularly, the present disclosure relates to polymer-based formulations that can be formed to produce an insulated non-aromatic polymeric material.

SUMMARY

According to the present disclosure, a polymeric material includes a polymeric resin and cell-forming agents. In illustrative embodiments, a blend of polymeric resins and cell-forming agents is mixed and extruded or otherwise formed to produce an insulated non-aromatic polymeric material.

In illustrative embodiments, an insulative cellular non-aromatic polymeric material produced in accordance with the present disclosure can be formed to produce an insulative cup or container. Polypropylene resin is used to form the insulative cellular non-aromatic polymeric material in illustrative embodiments.

In illustrative embodiments, an insulative cellular non-aromatic polymeric material comprises one or more of the following, a polypropylene base resin having high melt strength, polypropylene copolymer or homopolymer, and cell-forming agents. The cell-forming agents include at least one of the following, a chemical nucleating agent and a physical blowing agent.

In illustrative embodiments, a polypropylene-based formulation in accordance with the present disclosure is heated and extruded to produce a tubular extrudate (in an extrusion process) that can be formed to provide a strip of insulative cellular non-aromatic polymeric material. A physical blowing agent in the form of an inert gas is introduced into a molten resin before the tubular extrudate is formed.

In illustrative embodiments, the insulative cellular non-aromatic polymeric material has a density of less than about 0.6 grams per cubic centimeter. In illustrative embodiments, the insulative cellular non-aromatic polymeric material has a density in a range of about 0.2 grams per cubic centimeter to about 0.6 grams per cubic centimeter. In illustrative embodiments, the insulative cellular non-aromatic polymeric material has a density in a range of about 0.3 grams per cubic centimeter to about 0.5 grams per cubic centimeter.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying FIGURE in which:

FIG. 1 is a perspective view of an unassembled density determination apparatus showing the components (clockwise starting in the upper left) gem holder, platform, suspension bracket, and suspension spacer.

DETAILED DESCRIPTION

An insulative cellular non-aromatic polymeric material produced in accordance with the present disclosure can be formed to produce an insulative container such as an insulative cup. As an example, the insulative cellular non-aromatic polymeric material comprises a polypropylene base resin and one or more cell-forming agents. In one illustrative example, the insulative cellular non-aromatic polymeric material is located between and coupled to an inner polymeric layer and an outer polymeric layer to produce a multi-layer tube or multi-layer parison that is blow molded to form an insulative container.

A material-formulation process in accordance with the present disclosure uses a polypropylene-based formulation to produce a strip of insulative cellular non-aromatic polymeric material. The polypropylene-based formulation is heated in an extruder where a cell-forming agent is introduced into the molten formulation prior to extrusion of the materials from the extruder. As the molten materials exit the extruder, cells nucleate in the molten material and the material expands to form the sheet of insulative cellular non-aromatic polymeric material.

In one exemplary embodiment, a formulation used to produce the insulative cellular non-aromatic polymeric material includes at least one polymeric material. The polymeric material may include one or more base resins. In one example, the base resin is polypropylene. In an illustrative embodiment, a base resin can include DAPLOY™ WB140HMS polypropylene homopolymer available from Borealis AG of Vienna, Austria. In another illustrative embodiment, a base resin can include Braskem F020HC polypropylene homopolymer available from Braskem of Philadelphia, Pennsylvania. In an embodiment, a base resin can include both DAPLOY™ WB140HMS polypropylene homopolymer and Braskem F020HC polypropylene homopolymer.

In embodiments with more than one polypropylene copolymer base resin, different polypropylene copolymers can be used depending on the attributes desired in the formulation. Depending on the desired characteristics, the ratio of two polypropylene resins may be varied, e.g., 20%/80%, 25%/75%, 30%/70%, 35%/65%, 40%/60%, 45%/55%, 50%/50%, etc. In an embodiment, a formulation includes three polypropylene resins in the base resin. Again, depending on the desired characteristics, the percentage of three polypropylene resins can be varied, 33%/33%/33%, 30%/30%/40%, 25%/25%/50%, etc.

In an illustrative embodiment, a formulation includes one or more base resins. The amount of one or more base resins may be one of several different values or fall within several different ranges. It is within the scope of the present disclosure to select an amount of polypropylene to be one of the following values: about of 85%, 86%, 87%, 88%, 89%, 90%, 91%, 92%, 93%, 94%, 95%, 96%, 97%, 98%, 99%, 99.5%, and 99.9% of the total formulation by weight percentage. In a first set of ranges, the range of polypropylene base resin is one of the following ranges: about 85% to 90%, 85% to 92%, 85% to 95%, 85% to 96%, 85% to 97%, 85% to 98%, 85% to 99%, and 85% to 99.9% of the total formulation by weight percentage. In a second set of ranges, the range of polypropylene base resin is one of the following ranges: about 90 to 99.9%, 92% to 99.9%, 95% to 99.9%, 96% to 99.9%, 97% to 99.9%, 98% to 99.9%, and 99% to 99.9% of the total formulation by weight percentage. In a third set of ranges, the range of polypropylene base resin is one of the following ranges: about 87.5% to 95%, 87.5% to 96%, 95% to 99%, and 96% to 99% of the total formulation by weight percentage. The values and ranges are embodied in Examples 1 to 8.

In an embodiment, an insulative cellular non-aromatic polymeric material includes multiple layers. In an embodiment, a polymeric material as disclosed herein has an outer exterior skin layer in addition to the core layer of at least one base resin. In an embodiment, a polymeric material as disclosed herein has an inner exterior skin layer in addition to the core layer of at least one base resin. In an embodiment, a polymeric material includes both an exterior skin layer and an inner exterior skin layer in addition to the core layer of at least one base resin. In an embodiment, the outer skin layer can be polypropylene or polyethylene. In an embodiment, the inner skin layer can be polypropylene or polyethylene. In an embodiment where a polymeric material includes both an inner and outer skin layer in addition to the core layer of at least one base resin, the inner and outer skin layers can each be independently polypropylene or polyethylene.

In an embodiment, a skin layer comprising polypropylene can be a high stiffness polypropylene. In another illustrative embodiment, a skin layer comprising polypropylene can be a high impact polypropylene. In an embodiment, a skin layer comprising polypropylene can be DOW® D 207.03 developmental performance polypropylene resin. In an embodiment, a skin layer comprising polypropylene can be DOW® DC 7067.00 polypropylene impact copolymer. In an embodiment, an outer, inner, or both outer and inner skin layer can be solid or cellular (i.e., foamed). In an illustrative embodiment, the density of a skin layer (inner and/or outer) can be about 0.9 g/cm$^3$.

In an embodiment, either of the outer or inner skin layer can be a polyethylene. In an illustrative embodiment, the outer skin layer, the inner skin layer, or both the outer and inner skin layer includes a high density ethylene hexane-1 copolymer such as Chevron Phillips MARLEX® HHM 5502 BN.

Long chain branching refers to the presence of polymer side chains (branches) that have a length that is comparable or greater than a length of the backbone to which the polymer side chains are coupled. Long chain branching creates viscoelastic chain entanglements (polymer entanglements) that hamper flow during extensional or oriented stretching and provide for a strain hardening phenomenon. The strain hardening phenomenon may be observed through two analytical methods.

The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long chain branching will exhibit LVE flow characteristics. In comparison, long chain branched polymers will exhibit strain hardening and which causes a deviation from the LVE flow characteristics of the virgin polymer providing the hook formation under the same test conditions.

The second analytical method used to observe the presence of long chain branching is evaluating melt strength data as tested per ISO 16790 which is incorporated by reference herein in its entirety. An amount of melt strength is known to be directly related to the presence of long chain branching when compared to similar virgin polymers lacking long chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 cN while other similar PP resins lacking long chain branching have a melt strength of less than about 10 cN.

The formulation used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

In an illustrative embodiment, a formulation includes a physical nucleating agent (e.g., talc). The amount of a physical nucleating agent may be one of several different values or fall within several different ranges. It is within the scope of the present disclosure to select an amount of a physical nucleating agent to be one of the following values: about 0%, 0.1%, 0.25%, 0.5%, 0.75%, 1%, 1.5%, 2%, 2.5%, 3%, 4%, 5%, 6%, and 7% of the total formulation by weight percentage. In a first set of ranges, the range of physical nucleating agent is one of the following ranges: about 0% to 7%, 0.1% to 7%, 0.25% to 7%, 0.5% to 7%, 0.75% to 7%, 1% to 7%, 1.5% to 7%, 2% to 7%, 2.5% to 7%, 3% to 7%, 4% to 7%, 5% to 7%, and 6% to 7% of the total formulation by weight percentage. In a second set of ranges, the range of physical nucleating agent is one of the following ranges: about 0% to 6%, 0% to 5%, 0% to 4%, 0% to 3%, 0% to 2.5%, 0% to 2%, 0% to 1.5%, 0% to 1%, 0% to 0.75%, 0% to 0.5%, 0% to 0.25%, and 0% to 0.1% of the total formulation by weight percentage. In a third set of ranges, the range of physical nucleating agent is one of the following ranges: about 0.1% to 6%, 0.1% to 5%, 0.1% to 4%, 0.1% to 3%, 0.1% to 2.5%, 0.1% to 2%, 0.1% to 1.5%, 0.1% to 1%, 0.1% to 0.75%, 0.1% to 0.5%, and 0.1% to 0.25% of the total formulation by weight percentage. The values and ranges are embodied in Examples 1 to 8. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

In an illustrative embodiment, a formulation includes a nucleating agent. The amount of a nucleating agent may be one of several different values or fall within several different ranges. It is within the scope of the present disclosure to select an amount of a nucleating agent to be one of the following values: about 0.1%, 0.25%, 0.5%, 0.75%, 1%, 1.5%, 2%, 2.5%, 3%, 4%, 5%, 10%, and 15% of the total formulation by weight percentage. In a first set of ranges, the range of nucleating agent is one of the following ranges: about 0.1% to 15%, 0.25% to 15%, 0.5% to 15%, 0.75% to 15%, 1% to 15%, 1.5% to 15%, 2% to 15%, 2.5% to 15%, 3% to 15%, 4% to 15%, 5% to 15%, and 10% to 15% of the total formulation by weight percentage. In a second set of ranges, the range of nucleating agent is one of the following ranges: about 0.1% to 10%, 0.25% to 10%, 0.5% to 10%, 0.75% to 10%, 1% to 10%, 1.5% to 10%, 2% to 10%, 2.5% to 10%, 3% to 10%, 4% to 10%, and 5% to 10% of the total formulation by weight percentage. In a third set of ranges, the range of nucleating agent is one of the following ranges: about 0.1% to 5%, 0.25% to 5%, 0.5% to 5%, 0.75% to 5%, 1% to 5%, 1.5% to 5%, 2% to 5%, 2.5% to 5%, 3% to 5%, and 4% to 5% of the total formulation by weight percentage. The values and ranges are embodied in Examples 1 to 8.

A blowing agent refers to a physical or a chemical material (or combination of materials) that acts to expand nucleation sites. Blowing agents may include chemical blowing agents, physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, or air. Physical blowing agents may also include mixtures of alkanes such as, but not limited to, pentane, butane, and the like. In an illustrative example, a physical blowing agent may be introduced at a rate of about 0.07 pounds per hour to about 0.1 pounds per hour. In another illustrative example, the physical blowing agent may be introduced at a rate of about 0.74 pounds per hour to about 0.1 pounds per hour. In another illustrative example, the physical blowing agent may be introduced at a rate of about 0.75 to about 0.1 pounds per hour.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a slip agent is commercially available as AMPACET™ 102109 Slip PE MB. Another example of a slip agent that is commercially available is AMAPACET™ 102823 Process Aid PE MB.

In an illustrative embodiment, a formulation includes a slip agent. The amount of a slip agent may be one of several different values or fall within several different ranges. It is within the scope of the present disclosure to select an amount of a slip agent to be one of the following values: about 0%, 0.1%, 0.25%, 0.5%, 0.75%, 1%, 1.5%, 2%, 2.5%, and 3% of the total formulation by weight percentage. In a first set of ranges, the range of slip agent is one of the following ranges: about 0% to 3%, 0.1% to 3%, 0.25% to 3%, 0.5% to 3%, 0.75% to 3%, 1% to 3%, 1.5% to 3%, 2% to 3%, and 2.5% to 3% of the total formulation by weight percentage. In a second set of ranges, the range of slip agent is one of the following ranges: about 0% to 2.5%, 0% to 2%, 0% to 1.5%, 0% to 1%, 0% to 0.75%, 0% to 0.5%, 0% to 0.25%, and 0% to 0.1% of the total formulation by weight percentage. In a third set of ranges, the range of slip agent is one of the following ranges: about 0.1% to 2.5%, 0.1% to 2%, 0.1% to 1.5%, 0.1% to 1%, 0.1% to 0.75%, 0.1% to 0.5%, and 0.1% to 0.25% of the total formulation by weight percentage. The values and ranges are embodied in Examples 1 to 8. In an embodiment, the formulation lacks a slip agent.

In another aspect of the present disclosure, an impact modifier may be incorporated into the formulation to minimize fracturing of the insulative cellular non-aromatic polymeric material when subjected to an impact such as a drop test. One representative example of a suitable impact modifier is DOW® AFFINITY™ PL 1880G polyolefin plastomer.

In an illustrative embodiment, a formulation includes a colorant. The amount of a colorant may be one of several different values or fall within several different ranges. It is within the scope of the present disclosure to select an amount of a colorant to be one of the following values: about 0%, 0.1%, 0.25%, 0.5%, 0.75%, 1%, 1.5%, 2%, 2.5%, 3%, and 4% of the total formulation by weight percentage. In a first set of ranges, the range of colorant is one of the following ranges: about 0% to 4%, 0.1% to 4%, 0.25% to 4%, 0.5% to 4%, 0.75% to 4%, 1% to 4%, 1.5% to 4%, 2% to 4%, 2.5% to 4%, and 3% to 4% of the total formulation by weight percentage. In a second set of ranges, the range of colorant is one of the following ranges: about 0% to 3%, 0% to 2.5%, 0% to 2%, 0% to 1.5%, 0% to 1%, 0% to 0.75%, 0% to 0.5%, 0% to 0.25%, and 0% to 0.1% of the total formulation by weight percentage. In a third set of ranges, the range of colorant is one of the following ranges: about 0.1% to 2.5%, 0.1% to 2%, 0.1% to 1.5%, 0.1% to 1%, 0.1% to 0.75%, 0.1% to 0.5%, and 0.1% to 0.25% of the total formulation by weight percentage. The values and ranges are embodied in Examples 1 to 8. In an embodiment, the formulation lacks a colorant.

One or more additional components and additives optionally may be incorporated, such as, but not limited to, colorants (such as, but not limited to, titanium dioxide), and compound regrind.

In an embodiment, the insulative cellular non-aromatic polymeric material is located between and coupled to an inner polymeric layer and an outer polymeric layer to produce a multi-layer tube. For example, the multi-layer tube can be a bottle. In an embodiment, the insulative cellular non-aromatic polymeric material is located between and coupled to an inner polymeric layer and an outer polymeric layer to produce a multi-layer tube. For example, the multi-layer tube can be a bottle. It is within the scope of the present disclosure to select a bottle density to be one of the following values: about 0.5, 0.6, 0.65, 0.7, 0.75, 0.8, 0.9, 0.92, and 1 g/cm$^3$. In a first set of ranges, the range of density is one of the following ranges: about 0.5 to 0.92, 0.6 to 0.92, 0.7 to 0.92, 0.75 to 0.92, 0.8 to 0.92, and 0.5 to 1 g/cm$^3$ of the total formulation by weight percentage. In a second set of ranges, the range of density is one of the following ranges: about 0.5 to 0.9, 0.6 to 0.9, 0.7 to 0.9, 0.75 to 0.9, and 0.8 to 0.9 g/cm$^3$ of the total formulation by weight percentage. In a third set of ranges, the range of density is one of the following ranges: about 0.7 to 0.85, 0.7 to about 0.8, 0.72 to about 0.85, and 0.75 to 0.85 g/cm$^3$ of the total formulation by weight percentage. Density was determined according to the density test procedure outlined in Example 8.

In an embodiment, the insulative cellular non-aromatic polymeric material is located between and coupled to an inner polymeric layer and an outer polymeric layer to produce a multi-layer parison. It is within the scope of the present disclosure to select a multi-layer parison to be one of the following values: about 0.4, 0.45, 0.5, 0.55, 0.6, 0.65, 0.7, 0.75, and g/cm$^3$. In a first set of ranges, the range of density is one of the following ranges: about 0.4 to 0.8, 0.45 to 0.8, 0.5 to 0.8, 0.55 to 0.8, 0.6 to 0.8, 0.65 to 0.8, 0.7 to 0.8, and 0.75 to 0.8 g/cm$^3$ of the total formulation by weight percentage. In a second set of ranges, the range of density is one of the following ranges: about 0.4 to 0.7, 0.45 to 0.7, 0.5 to 0.7, 0.55 to 0.7, 0.6 to 0.7, and 0.65 to 0.7 g/cm$^3$ of the total formulation by weight percentage. In a third set of ranges, the range of density is one of the following ranges: about 0.4 to 0.6, 0.5 to 0.6, and 0.4 to 0.5 g/cm$^3$ of the total formulation by weight percentage. Density was determined according to the density test procedure outlined in Example 8.

Before the drop test is performed, the insulative cellular non-aromatic polymeric material is coupled and located between two polymeric layers to form a multi-layer parison. The multi-layer parison is then formed, for example, via blow molding into a container. The resulting container is then tested according to one of the Plastic Bottle Institute Test for Drop Impact Resistance of Plastic Bottles, PBI 4-1968, Rev. 2-1988 test method and the Rigid Plastics Container Division of the The Society of Plastics Industry, Inc. RPCD-7-1991 test method.

In another example, the drop test may be performed according to the following procedure. The container is filled with water and closed off with, for example, a lid. The sample container is then held at about 73 degrees Fahrenheit (22.8 degrees Celsius) and about 50% relative humidity. The filled, capped containers are then subjected to the following procedure: (a) the filled, capped container is located at about five feet above a hard surface such as concrete or tile; (b) the filled, capped container is then oriented such that a bottom of the filled, capped container is arranged to lie in a substantially parallel relation to the hard surface; (c) each of ten capped, filled containers are dropped; (d) upon impact, each filled, capped container is examined for any break or shattering of the wall that causes water to leak out of the bottle; and (d) the total number of bottles showing any sign of leakage after the drop test are counted as failures.

According to an aspect of the present disclosure, there is provided a method of forming a multi-later parison formed from insulative cellular non-aromatic polymeric material, the method comprising the steps of:

a) heating, to a molten state, a mixture comprising: at least 85% (w/w) of at least one polypropylene base resin; 0-15% (w/w) of at least one chemical nucleating agent; and 0-3% (w/w) of a slip agent;
b) injecting a blowing agent into the molten mixture;
c) extruding the molten mixture resulting from step b) to form a core layer, wherein said mixture is co-extruded with an outer skin layer to form a multi-layer parison.

The core layer and outer skin layer forming the multi-layer parison are disposed one directly on top of the other, in the sense that the core layer and outer skin layers are coupled to one another.

In an embodiment, step c) is performed without the use of a tandem extruder arrangement.

In another embodiment, step c) comprises extruding the molten mixture resulting from step b) to form a core layer, wherein said mixture is co-extruded with an outer skin layer and an inner skin layer to form a multi-layer parison. Where the multi-layer parison comprises both outer and inner skin layers, it will be understood that the core layer is disposed between said outer an inner skin layers, such that a first surface of the core layer is coupled to the outer skin layer, and a second surface of the core layer opposite the said first surface is coupled to said inner skin layer.

In another embodiment, step c) further comprises co-extruding any number of additional layers with the core layer and the outer skin layer.

In another embodiment, the outer and inner skin layers each comprise polypropylene or polyethylene.

In one example, the polypropylene used in either of the skin layers is a high stiffness polypropylene. In another example, the polypropylene used in either of the skin layers is a high impact polypropylene. In another example, the polypropylene used in either of the skin layers is DOW® D 207.03 developmental performance polypropylene resin or DOW® DC 7067.00 polypropylene impact copolymer.

In one example, the polyethylene used in either of the skin layers is a high density ethylene hexane-1 copolymer. In another example, the polyethylene used in either of the skin layers is Chevron Phillips MARLEX® HHM 5502 BN.

In one example, both of the outer and inner skin layers are a formed from a polypropylene selected from DOW® D 207.03 developmental performance polypropylene resin or DOW® DC 7067.00 polypropylene impact copolymer.

In example, the mixture of step a) is 79-82% (w/w) of a first polypropylene homopolymer;
14-16% (w/w) of a second polypropylene homopolymer;
0.01-1.5% (w/w) of a chemical nucleating agent;
1-3% (w/w) of a slip agent; and
0.1-1% (w/w) of a physical nucleating agent.

In another embodiment, the method further comprises a step d) of blow-molding the multi-layer parison resulting from step c) to provide a container formed from insulative cellular non-aromatic polymeric material.

According to another aspect of the present disclosure, there is provided a method of forming a multi-later parison formed from insulative cellular non-aromatic polymeric material, the method comprising the steps of:

a) heating, to a molten state, a mixture comprising: at least 85% (w/w) of at least one polypropylene base resin; 0-15% (w/w) of at least one chemical nucleating agent; and 0-3% (w/w) of a slip agent;
b) injecting a blowing agent into the molten mixture;
c) extruding the molten mixture resulting from step b) to form a core layer, wherein said mixture is co-extruded with an outer skin layer to form a multi-layer parison; and
d) blow-molding the multi-layer parison resulting from step c) to provide a container formed from insulative cellular non-aromatic polymeric material.

According to another aspect of the present disclosure, there is provided a multi-layer parison obtainable, obtained, or directly obtained by a process defined herein.

According to another aspect of the present invention, there is provided a container obtainable, obtained, or directly obtained by a process defined herein.

Example 1

Formulation and Extrusion

In the mono-layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81.4% | Borealis WB140 HMS polypropylene homopolymer |
| 15% | Braskem F020HC polypropylene homopolymer |
| 0.1% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture.

The $N_2$ was injected at about 0.0751 lbs/hr and about 0.0750 lbs/hr into the resin blend to expand the resin and reduce density. The mixture thus formed was extruded through a die head into a parison. The parison was then blow molded with air to form a container.

Containers were formed from a monolayer tube. A mono-layer tube used to form insulative cellular non-aromatic polymeric bottle had a density of about 0.670 grams per cubic centimeter when both about 0.0751 lbs/hr and about 0.0750 lbs/hr of $N_2$ were added to the molten resin mixture.

Example 2

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81.45% | Borealis WB140 HMS polypropylene homopolymer |
| 15% | Braskem F020HC polypropylene homopolymer |
| 0.05% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.075 lbs/hr into the resin blend to expand the resin and reduce density.

The mixture thus formed was communicated to a co-extrusion die where the mixture was extruded to form a core layer along with an outer skin layer to establish a multi-layer parison. The multi-layer parison was then blow molded with air to form a container. In one example, the outer skin comprises a polypropylene resin. In another example, the outer skin was comprised of DOW® DC 7067.00 polypropylene impact copolymer.

The multi-layer parison was then blow molded to form an insulative cellular non-aromatic polymeric bottle which had a bottle density of about 0.7 grams per cubic centimeter and the core layer had a density of about 0.665 grams per cubic centimeter.

Example 3

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81.45% | Borealis WB140 HMS polypropylene homopolymer |
| 15% | Braskem F020HC polypropylene homopolymer |
| 0.05% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.074 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

The multi-layer parison was then blow molded to form an insulative cellular non-aromatic polymeric bottle which had a bottle density of about 0.71 grams per cubic centimeter when and the core layer had a density of about 0.677 grams per cubic centimeter.

Example 4

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81% | Borealis WB140 HMS polypropylene homopolymer |
| 15% | Braskem F020HC polypropylene homopolymer |
| 0.5% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.074 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

The multi-layer parison was then blow molded to form an insulative cellular non-aromatic polymeric bottle which had a bottle density of about 0.69 grams per cubic centimeter when and the core layer had a density of about 0.654 grams per cubic centimeter.

Example 5

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 81% | Borealis WB140 HMS polypropylene homopolymer |
| 15% | Braskem F020HC polypropylene homopolymer |
| 0.5% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.1 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

The multi-layer parison was then blow molded to form an insulative cellular non-aromatic polymeric bottle which had a bottle density of about 0.53 grams per cubic centimeter when and the core layer had a density of about 0.472 grams per cubic centimeter.

Example 6

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 80.5% | Borealis WB140 HMS polypropylene homopolymer |
| 15% | Braskem F020HC polypropylene homopolymer |
| 1.0% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.1 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polypropylene resin. In another example, the outer skin was comprised of DOW® DC 7067.00 polypropylene impact copolymer and the inner skin was comprised of DOW® PP D207.03 developmental performance polypropylene resin.

In one example, the multi-layer parison was then blow molded to form an insulative cellular non-aromatic polymeric bottle which had a bottle density of about 0.49 grams per cubic centimeter when and the core layer had a density of about 0.427 grams per cubic centimeter. In another example, the multi-layer parison was then blow molded to form an insulative cellular non-aromatic polymeric bottle which had a bottle density of about 0.54 grams per cubic centimeter when and the core layer had a density of about 0.483 grams per cubic centimeter.

Example 7

Formulation and Extrusion

In a core layer, Borealis WB140HMS polypropylene homopolymer was used as the primary polypropylene base resin. Braskem F020HC polypropylene homopolymer was used as the secondary polypropylene base resin. The resins were blended with Hydrocerol CF-40E as the primary nucleation agent, Heritage Plastics HT4HP talc as a secondary nucleation agent, Ampacet 102823 Process Aid PE MB LLDPE as a slip agent, Colortech 11933-19 colorant, and $N_2$ as the blowing agent. The percentages were:

| | |
|---|---|
| 80.5% | Borealis WB140 HMS polypropylene homopolymer |
| 15% | Braskem F020HC polypropylene homopolymer |
| 1.0% | Hydrocerol CF-40E Chemical Blowing Agent |
| 2% | Ampacet 102823 Process Aid PE MB LLDPE |
| 1% | Colortech 11933-19 Titanium Oxide |
| 0.5% | Heritage Plastics HT4HP Talc |

The formulation was added to an extruder hopper. The extruder heated the formulation to form a molten resin mixture. The $N_2$ was injected at about 0.1 lbs/hr into the resin blend to expand the resin and reduce density.

The mixture thus formed was communicated to a co-extrusion die where the mixture was extruded to form a core layer located between an outer skin layer and an inner skin layer to establish a multi-layer parison. The multi-layer parison was then blow molded with air to form a container. In one example, both the outer skin and the inner skin comprise a polyethylene resin. In another example, both the outer skin and the inner skin were comprised of high density ethylene hexane-1 copolymer (Chevron Phillips Marlex® HHM 5502 BN).

In one example, multi-layer parison was then blow molded to form an insulative cellular non-aromatic polymeric bottle which had a bottle density of about 0.49 grams per cubic centimeter when and the core layer had a density of about 0.427 grams per cubic centimeter.

Example 8

Density Measurements

This Example demonstrates the test used to measure the density of filled and unfilled polymer parts.

Procedure

The density was determined by the apparatus shown, unassembled, in FIG. 1. Although not shown in FIG. 1, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm3, so most unfilled polymers require some other suspension fluid such as isopropyl alcohol, density=0.8808 g/cm3. A Mettler AT400 balance (Mettler-Toledo LLC, Columbus, OH) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

The invention claimed is:

1. A container comprising a first layer formed from a first formulation comprising polypropylene, and a core layer comprising an insulative cellular non-aromatic polymeric material formed from a second formulation comprising a first polypropylene resin, a second polypropylene resin, and at least one nucleating agent, wherein the first layer has been extruded onto the core layer so that the core layer and the first layer are in direct contact, wherein the first layer has a density of about 0.9 g/cm$^3$, wherein the first polypropylene resin and the second polypropylene resin together are at least 85 wt % of the insulative cellular non-aromatic polymeric material, and the at least one nucleating agent is up to about 15 wt % of the insulative cellular non-aromatic polymeric material, and wherein the first formulation is different from the second formulation.

2. The container of claim 1, wherein the container has a density of about 0.5 g/cm$^3$ to about 0.8 g/cm$^3$.

3. The container of claim 1, wherein the first layer is a solid layer having a density of about 0.9 g/cm$^3$.

4. The container of claim 1, wherein the first layer comprises solid polypropylene, wherein the container has a density of about 0.5 g/cm$^3$ to about 0.8 g/cm$^3$, and wherein insulative cellular non-aromatic polymeric material has a density of about 0.3 g/cm$^3$ to about 0.6 g/cm$^3$.

5. The container of claim 1, wherein the insulative cellular non-aromatic polymeric material further comprises a third polypropylene resin.

6. The container of claim 5, wherein the first, second, and third polypropylene resins are at least about 96% wt % to about 99.9% wt %.

7. The container of claim 6, wherein the first polypropylene resin is a polypropylene homopolymer and the second polypropylene resin is a polypropylene homopolymer.

8. The container of claim 7, wherein the third polypropylene is a polypropylene homopolymer.

9. The container of claim 1, wherein the at least one nucleating agent is about 0.1 wt % to about 0.5 wt % of the insulative cellular non-aromatic material.

10. The container of claim 9, wherein insulative cellular non-aromatic polymeric material further comprises a third polypropylene resin and the first, second, and third polypropylene resins together are at least about 96% wt % to about 99.9% wt %.

11. The container of claim 10, wherein the insulative cellular non-aromatic polymeric material further comprises regrind of the insulative cellular non-aromatic polymeric material.

12. The container of claim 10, wherein the ratio of the first polypropylene resin to the second polypropylene resin is 45% to 55%, and the first polypropylene resin is different from the second polypropylene resin.

13. The container of claim 12, wherein the container has a density of about 0.5 g/cm$^3$ to about 0.8 g/cm$^3$.

14. The container of claim 12, wherein the first layer is a solid layer having a density of about 0.9 g/cm$^3$.

15. The container of claim 1, wherein the insulative cellular non-aromatic polymeric material further comprises a third polypropylene resin, wherein the first, second, and third polypropylene resins are at least about 96 wt % to about 99.9 wt %.

16. The container of claim 15, wherein the first polypropylene resin is a polypropylene homopolymer, the second polypropylene resin is a polypropylene homopolymer, and the third polypropylene is a polypropylene homopolymer.

17. A container comprising a first layer formed from a first formulation comprising polypropylene, and a core layer comprising an insulative cellular non-aromatic polymeric material formed from a second formulation comprising a first polypropylene resin, a second polypropylene resin, and at least one nucleating agent, wherein the first layer has been extruded onto the core layer so that the core layer and the first layer are in direct contact, wherein the first polypropylene resin and the second polypropylene resin together are at least 85 wt % of the insulative cellular non-aromatic polymeric material, and the at least one nucleating agent is up to about 15 wt % of the insulative cellular non-aromatic polymeric material, wherein the insulative cellular non-aromatic polymeric material further comprises regrind of the insulative cellular non-aromatic polymeric material, and wherein the first formulation is different from the second formulation.

18. A container comprising a first layer formed from a first formulation comprising polypropylene, and a core layer comprising an insulative cellular non-aromatic polymeric material formed from a second formulation comprising a first polypropylene resin, a second polypropylene resin, and at least one nucleating agent, wherein the first formulation is different from the second formulation;

wherein the first layer has been extruded onto the core layer so that the core layer and the first layer are in direct contact, wherein the first layer has a density of about 0.9 g/cm$^3$, the insulative cellular non-aromatic polymeric material has a density of about 0.3 g/cm$^3$ to about 0.6 g/cm$^3$, and the container has a density of about 0.5 g/cm$^3$ to about 0.8 g/cm$^3$, wherein the first polypropylene resin and the second polypropylene resin together are at least 85 wt % of the insulative cellular non-aromatic polymeric material, and the at least one nucleating agent is up to about 15 wt % of the insulative cellular non-aromatic polymeric material.

19. The container of claim 18, wherein the insulative cellular non-aromatic polymeric material further comprises regrind of the insulative cellular non-aromatic polymeric material.

20. The container of claim 18, wherein the first layer comprises a high stiffness polypropylene, a high impact polypropylene, or a combination thereof.

* * * * *